US012589958B2

(12) United States Patent
Campbell

(10) Patent No.: US 12,589,958 B2
(45) Date of Patent: Mar. 31, 2026

(54) MODULAR BASE FOR DRIVING CONVEYORS AND RELATED COMPONENTS

(71) Applicant: Reh Sanders Enterprises, LLC, Fishers, NY (US)

(72) Inventor: Colin A. Campbell, Guelph (CA)

(73) Assignee: Reh Sanders Enterprises, LLC, Fishers, NY (US)

( * ) Notice: Subject to any disclaimer, the term of this patent is extended or adjusted under 35 U.S.C. 154(b) by 192 days.

(21) Appl. No.: 18/196,818

(22) Filed: May 12, 2023

(65) Prior Publication Data

US 2023/0365357 A1 Nov. 16, 2023

Related U.S. Application Data

(60) Provisional application No. 63/342,117, filed on May 15, 2022.

(51) Int. Cl.
| | |
|---|---|
| *B65G 67/08* | (2006.01) |
| *B65G 21/12* | (2006.01) |
| *B65G 21/14* | (2006.01) |

(52) U.S. Cl.
CPC ............. *B65G 67/08* (2013.01); *B65G 21/12* (2013.01); *B65G 21/14* (2013.01)

(58) Field of Classification Search
CPC ......... B65G 21/14; B65G 21/12; B65G 67/08
USPC .................. 198/300, 310, 313, 302; 414/347
See application file for complete search history.

(56) References Cited

U.S. PATENT DOCUMENTS

| | | | | |
|---|---|---|---|---|
| 4,425,069 A | * | 1/1984 | Saur ....................... | B65G 67/08 414/398 |
| 4,643,299 A | | 2/1987 | Calundan | |
| 5,256,021 A | * | 10/1993 | Wolf ...................... | B65G 67/08 414/676 |
| 5,325,953 A | | 7/1994 | Doster et al. | |
| 8,262,334 B2 | * | 9/2012 | Christensen ......... | B65G 41/002 198/581 |

(Continued)

FOREIGN PATENT DOCUMENTS

| | | |
|---|---|---|
| CA | 2718881 | 10/2010 |
| CA | 2854306 | 6/2014 |

(Continued)

OTHER PUBLICATIONS

JP2019534223 (Year: 2019).*

(Continued)

*Primary Examiner* — Gene O Crawford
*Assistant Examiner* — Lester Rushin, III
(74) *Attorney, Agent, or Firm* — Duane C. Basch

(57) ABSTRACT

The various conveying embodiments disclosed are directed to systems, methods and components enabling extendible conveying mechanisms to reach into trailers and storage containers so that operators may safely and ergonomically load and unload objects such as packages, etc. The disclosed embodiments include a modular driving apparatus suitable for driving an extendible conveyor as well as supporting and moving an associated interface conveyor and configurable (e.g., width and height) operator platform. Also disclosed is a telescoping, bi-directional conveyor embodiment and a movable conveyor interface.

61 Claims, 29 Drawing Sheets

(56) References Cited

U.S. PATENT DOCUMENTS

| | | | | |
|---|---|---|---|---|
| 8,262,354 | B2 * | 9/2012 | Hoffmann | G01L 5/24 |
| | | | | 416/61 |
| 10,899,548 | B2 | 1/2021 | Sachs | |
| 12,378,082 | B2 * | 8/2025 | Ligman | B65G 41/002 |
| 12,398,006 | B2 * | 8/2025 | Wilson | B65G 67/08 |
| 2009/0274246 | A1 | 11/2009 | Ryoo et al. | |
| 2012/0097498 | A1 | 4/2012 | Campbell et al. | |
| 2012/0111648 | A1 | 5/2012 | Terashima et al. | |
| 2013/0277175 | A1 | 10/2013 | Campbell et al. | |
| 2018/0222695 | A9 | 8/2018 | Girtman et al. | |
| 2019/0118476 | A1 * | 4/2019 | Damiano | B01J 8/006 |

FOREIGN PATENT DOCUMENTS

| | | |
|---|---|---|
| CN | 209051988 | 7/2019 |
| CN | 215479485 | 1/2022 |
| EP | 1826154 | 8/2007 |
| EP | 2243728 | 4/2010 |
| GB | 2410482 | 10/2007 |
| KR | 1020110039597 | 4/2011 |
| WO | WO2019120597 | 10/2018 |

OTHER PUBLICATIONS

EP3441287 (Year: 2019).*
Republication of International Search Report for PCT/US2023/022055 Feb. 1, 2024.
International Preliminay Report for PCT/US2023/022055 Nov. 28, 2024 Nov. 28, 2024.
Destuff—IT Service and Maintenance Manual; Engineered Lifting Systems & Equipment Inc.; 36 pages.
International Search Report and Written Opinion for PCT/US2023/022055 Dec. 14, 2023.

* cited by examiner

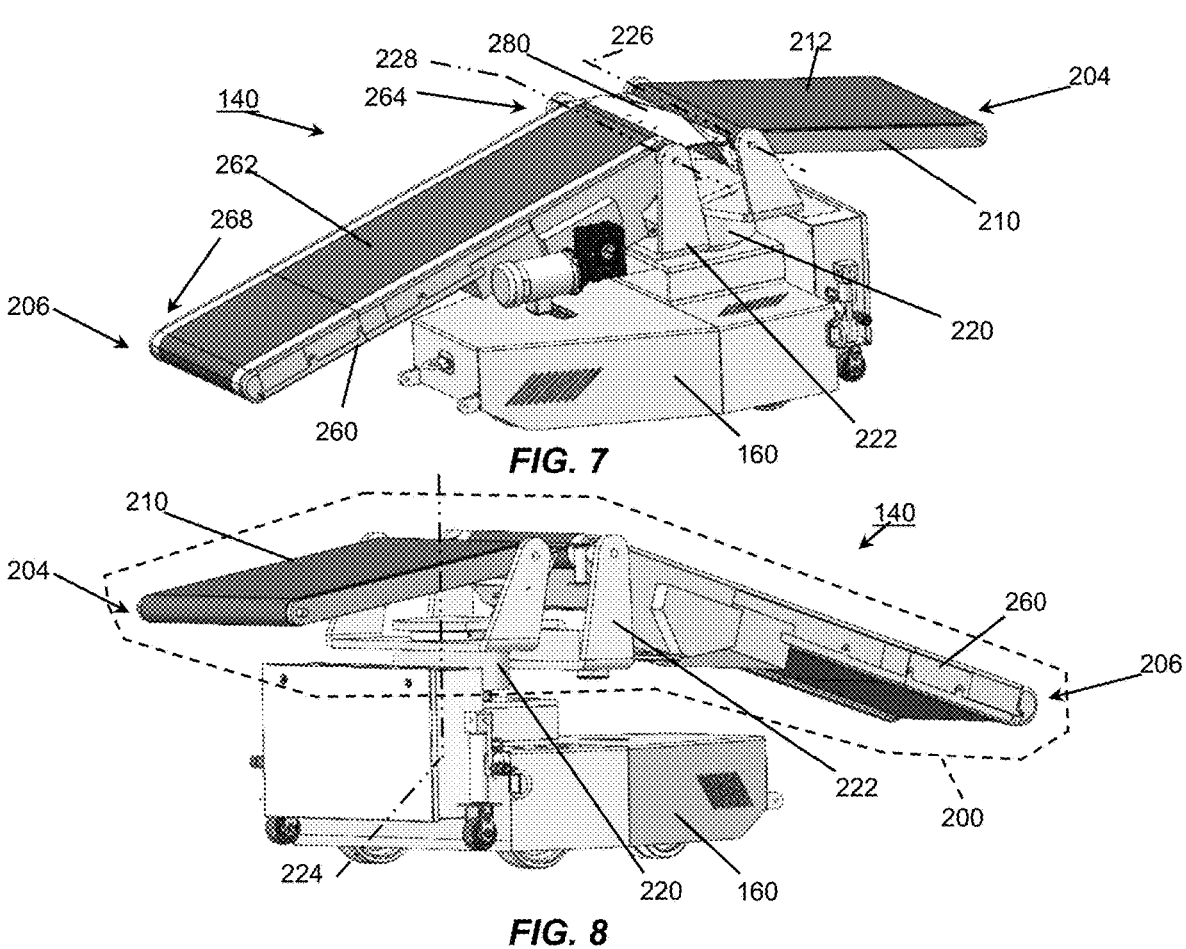
FIG. 7
FIG. 8
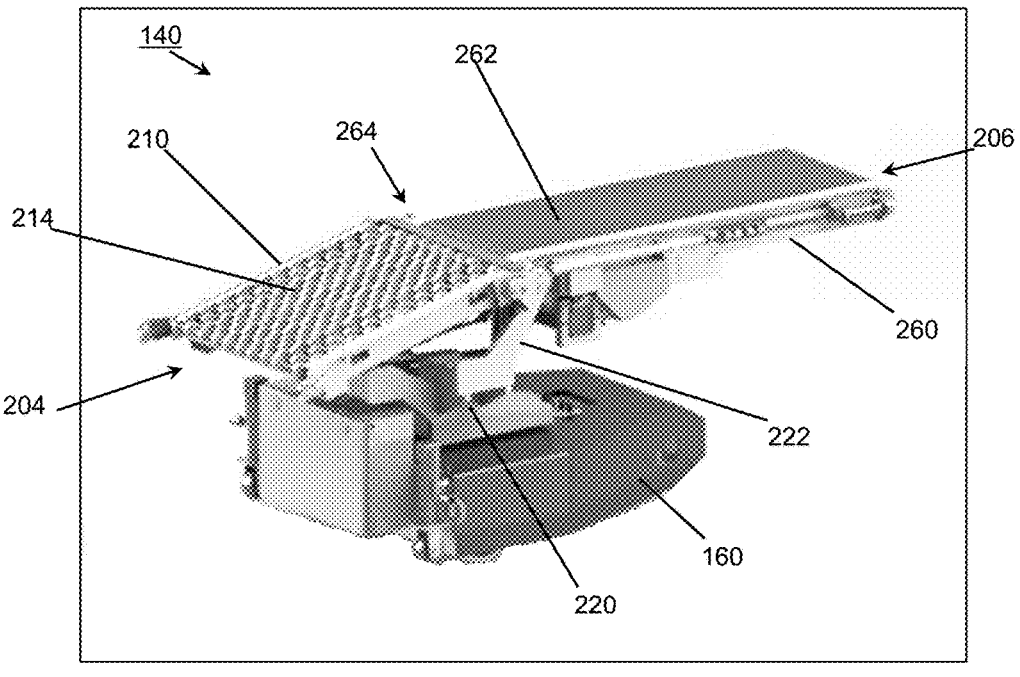
FIG. 9

MODULAR BASE FOR DRIVING CONVEYORS AND RELATED COMPONENTS

This application claims priority under 35 U.S.C. § 119(e) from U.S. Provisional Patent Application No. 63/342,117, fora MODULAR BASE FOR DRIVING CONVEYORS AND RELATED COMPONENTS, filed May 15, 2022 by Colin A. Campbell, which is hereby incorporated by reference in its entirety.

CROSS-REFERENCE

The following US patent applications are hereby cross-referenced and the disclosures thereof incorporated herein by reference in their entirety: US Patent Publication No. 2012/0097498 A1, for CONVEYOR APPARATUS FOR UNLOADING PACKAGES FROM SHIPPING CONTAINERS, by Colin A. Campbell et al., published Apr. 26, 2012 (application Ser. No. 12/911,857, filed Oct. 26, 2010), US Patent Publication No. 2013/0277175 A1, for CONVEYOR APPARATUS FOR UNLOADING PACKAGES FROM SHIPPING CONTAINERS, by Colin A. Campbell et al., published Oct. 24, 2013 (application Ser. No. 13/917, 832, filed Jun. 14, 2013); and US Patent Publication No. 2023/0045842 A1, for CONTAINER HANDLING APPARATUS AND SYSTEM FOR INTERFACING WITH A TELESCOPING CONVEYOR, by Colin A. Campbell, published Feb. 16, 2023 (application Ser. No. 17/886,525, filed Aug. 12, 2022).

The modular base or driving apparatus is customizable to connect with and drive various conveyor types to facilitate loading and unloading packages from shipping containers and trailers.

BACKGROUND AND SUMMARY

As noted in US Patent Publication No. 2012/0097498 A1, modem supply networks utilize warehouses and distribution centers to receive, sort and temporarily store products before distributing them to wholesalers, retailers, or directly to consumers. As a result, warehouses and distribution centers receive vast amounts of packaged products on a daily basis and many of these products arrive in packages on transport trucks, trailers and shipping containers. These packages are typically unloaded by operators and then placed on a conveyor system that sorts and routes the packages to different areas within the facility for later distribution. In many cases, these packages are unloaded and reloaded using manual labor.

A common problem with such facilities is that the loading/unloading process is often ergonomically inefficient when packages or objects are moved between the trailer, or shipping container, and the conveyor. For example, the conveyor may not be able to reach to the end of the trailer resulting in operators having to hand-carry objects, or the conveyor may not be adjustable in height or position, leading to operators having to lift objects from/to awkward positions. It is also possible that when operators are incentivized to load or unload faster, injuries can result from moving equipment. For example, trailers are often filled with packages from the floor to ceiling and employees sometimes strain themselves when repeatedly bending over to pick up the bottommost packages, or over-reaching to grab the topmost packages. These repeated physical strains can cause short and long-term injuries. Even the seemingly simple task of carrying packages within the trailer can be hazardous, particularly with heavier packages, trailers parked on sloped surfaces, etc. Accordingly, it is desirable to provide equipment that reduces health and safety concerns associated with unloading trailers.

It is known to employ a driving machine that connects to the end of a conveyor for the purpose of moving or controlling the position of such a conveyor. Product such as the Engineered Lifting Systems & Equipment Inc. Destuff-it™ and Restuff-it™, and as disclosed in the published US patent applications noted above. While such systems are capable of connection to the free end of telescoping conveyors for driving and steering, they are a specific product design—one that does not facilitate mass-production of a common drive component usable with a range of conveyors and allowing for a customizable interface to the various conveyors.

As will also be appreciated by those familiar with the loading and unloading of trucks and trailers, particularly in high-capacity warehouses and high-throughput distribution centers, the size and nature of objects shipped in trucks and trailers can vary, even within a load. For example, it is not uncommon to have mixed loads, where some objects are palletized, and others are simply boxed and stacked in the bed of the truck, trailer or shipping container. In cases of mixed loads or varying object sizes, it may be desirable for a conveyor and/or operator platform to extend into the confined space of the truck, trailer or shipping container to facilitate operator loading or unloading of floor loaded objects, palletized objects and stacked objects such as boxes, cases and totes. Often the type of load varies by truck, so there is an advantage in using conveyors and components that are adaptable or adjustable to the circumstances.

To address the varying load configurations and object types, the disclosed embodiments include a modular system that places conveyors and/or operators in positions to ergonomically load and unload floor loaded objects or product, both at low height (bed level) and high heights (ceiling level) in the confined spaces of trucks, trailers, and containers. Typically no platform is provided for bed-level objects or objects at a safe lifting height, whereas a platform that is adjustable in height and/or width is advantageous for loading and unloading objects stacked at higher levels. Moreover, providing an operator platform that is capable of retracting into itself, to reduce its width, facilitates moving such a platform within a space that has a mixed load such as large or palletized objects, say on one side of the container. A retractable platform allows movement around obstructions and allows operators to move past other objects or machines in the confined space (e.g., truck, trailer, container, etc.) The retractable platform also allows transport of the large or palletized objects past the retractable platform. Accordingly, several of the disclosed embodiments provide a mobile solution, perhaps including a conveyor and loading/unloading apparatus that can be moved into and out of confined spaces and even between docking locations.

One module of the disclosed system is a driving apparatus that may be operatively attached to steer (push & pull) a flexible or extendible conveyor into and out of a truck, trailer or container. Pivotably and/or slidably mounted on the modular driving apparatus is a conveying assembly that may include one, two or more conveyors that both interface with an end of the extendible conveyor to exchange objects, and with an operator(s) to facilitate the loading and unloading of the conveyed objects. The conveying assembly may use one or more powered conveyor surfaces, including belts, rollers and the like, as part of such interfaces, and the conveyor surfaces may be adjustable to facilitate object movement. The modular driving apparatus may include additional features such as a zero-turn capability, lighting, and a sensor array that enables safe movement, both across varying surfaces and relative to the walls of the truck, trailer or container, as well as around pallets and other objects, including operators.

In the disclosed modular driving apparatus, the design and features facilitate mass production to take advantage of economies of scale, and at the same time facilitating customization so that the modular apparatus not only connects to and drives or moves a conveyor but may include conveying components that interface to such conveyors. Use of the modular driving apparatus and its intended customizations provide ergonomic benefit to the operator by reducing the lifting effort of objects such as packages exiting and entering the conveyor, and further eliminate operator pushing and pulling of conveyors in attempts to steer or move them. Such features are anticipated to provide a safety benefit by reducing the number of injuries reported by operators. Also contemplated is improved efficiency in loading and unloading trailers and containers by facilitating a safe increase in the rate packages are unloaded and loaded from the conveyor.

Disclosed in embodiments herein is a modular driving apparatus, comprising: a frame including a front end and a back end; first and second independent drive wheels pivotally connected to the frame along a common axis, each drive wheel operatively connected to a respective one of first and second independent drive motors attached to the frame adjacent the back end, wherein a portion of each drive wheel extends below the bottom of the frame; at least one caster wheel attached to the frame adjacent the front end and at a position spaced apart from the common axis, said caster wheel having a portion extending below the bottom of the frame; a power source providing power to operate each of the first and second independent drive motors in response to control signals; and an attachment pedestal, extending upward from the frame, to which one or more conveyor interface components may be operatively attached.

Further disclosed in embodiments herein is a bi-directional conveyor, comprising: a plurality of telescoping conveyor sections, including an outermost conveyor section of a first width, the outermost conveyor section includes a pair of opposed side members, at least one pair of auto-leveling legs attached to and supporting the opposed side members of the outermost conveyor section adjacent an end thereof, at least one pair of guide rollers and a pair of opposed guide channels are mounted on an interior of each opposed side member of the outermost conveyor section, a conveying surface located between the opposed side members of the outermost conveyor section, wherein at least a portion of the conveying surface may be driven, and a power ramp at a first end of the outermost conveyor section to facilitate transfer of an object (e.g., package) between the outermost conveyor section and the adjacent nested conveyor section; and an extendible conveyor section nested within the outermost conveyor section, the extendible conveyor section includes a pair of opposed side members, at least one pair of auto-leveling legs attached to and supporting the opposed side members of the extendible conveyor section, a guide rail mounted on an exterior of each opposed side member of the extendible conveyor section, where said guide rail passes through the rollers and guide rails of the outermost conveyor section to facilitate telescoping of the extendible section relative to the outermost conveyor section, and a conveying surface located between the opposed side members of the extendible conveyor section, wherein at least a portion of the conveying surface may be driven.

Also disclosed herein is a bi-directional conveyor, comprising: a plurality of telescoping conveyor sections, including an outermost conveyor section of a first width, the outermost conveyor section includes a pair of opposed side members, at least one pair of auto-leveling legs attached to and supporting the opposed side members of the outermost conveyor section adjacent an end thereof, at least one pair of guide rollers and a pair of opposed guide channels are mounted on an interior of each opposed side member of the outermost conveyor section, a conveying surface located between the opposed side members of the outermost conveyor section, wherein at least a portion of the conveying surface may be driven, and a power ramp at a first end of the outermost conveyor section to facilitate transfer of an object (e.g., package) between the outermost conveyor section and the adjacent nested conveyor section; a plurality of extendible conveyor sections nested within the outermost conveyor section, each of the extendible conveyor sections has a progressively smaller width and includes a pair of opposed side members, at least one pair of auto-leveling legs attached to and supporting the opposed side members of the extendible conveyor section, at least one pair of guide rollers and a pair of opposed guide channels mounted on an interior of each opposed side member of the extendible conveyor section and a guide rail mounted on an exterior of each opposed side member of the extendible conveyor section, where said guide rail passes through the rollers and guide rails of an adjacent conveyor section to facilitate telescoping of the extendible section relative to the adjacent conveyor section, a conveying surface located between the opposed side members of the extendible conveyor section, wherein at least a portion of the conveying surface may be driven, and a power ramp at a first end of the extendible conveyor section to facilitate transfer of an object (e.g., package) between adjacent conveyor sections; and an innermost conveyor section nested within one of the extendible conveyor sections, the innermost conveyor section includes a pair of opposed side members, at least one pair of auto-leveling legs attached to and supporting the opposed side members of the innermost conveyor section, a guide rail is mounted on an exterior of each opposed side member of the final innermost conveyor section, where said guide rail passes through the rollers and guide rails of an adjacent one of the extendible conveyor sections to facilitate a telescoping of the innermost section relative to the adjacent conveyor section, and a conveying surface located between the opposed side members of the innermost conveyor section, wherein at least a portion of the conveying surface may be driven.

Disclosed in embodiments herein is a movable conveying system for loading and unloading objects from an extendible conveyor comprising: a driving apparatus removably connectable to the extendible conveyor; an adjustable conveying apparatus including at least one pivoting conveyor operatively affixed on the driving apparatus, said adjustable conveying apparatus suitable to exchange objects (e.g., packages) with the extendible conveyor on a first end and with an operator on an opposite second end; and a movable operator platform removably connected to the driving apparatus and positioned beneath the second end of the pivoting conveyor.

Also disclosed in embodiment herein is a movable operator platform suitable for attachment to a conveyor driving apparatus, the movable operator platform comprising: a telescoping base including a first generally C-shaped frame member and a second generally T-shaped frame member, wherein the second frame member slides horizontally within the first frame member such that a footprint of the base is expanded or contracted by sliding the second base frame member relative the first base frame member; a plurality of caster wheels attached to the bottom of each of the first and second frame members of the telescoping base; a telescoping operator platform including an outer frame member and an inner frame member, wherein the inner frame member slides horizontally within the outer frame member such that a footprint of the operator platform is expanded or contracted by sliding the inner frame member relative the outer frame member; and a platform elevation system operatively connecting the telescoping base to the operator platform to enable the height of the operator platform to be controlled relative to the telescoping base.

BRIEF DESCRIPTION OF THE DRAWINGS

FIGS. 7-9 are perspective views of a conveyor interface component in accordance with an aspect of the disclosed embodiments;

Figure 1:
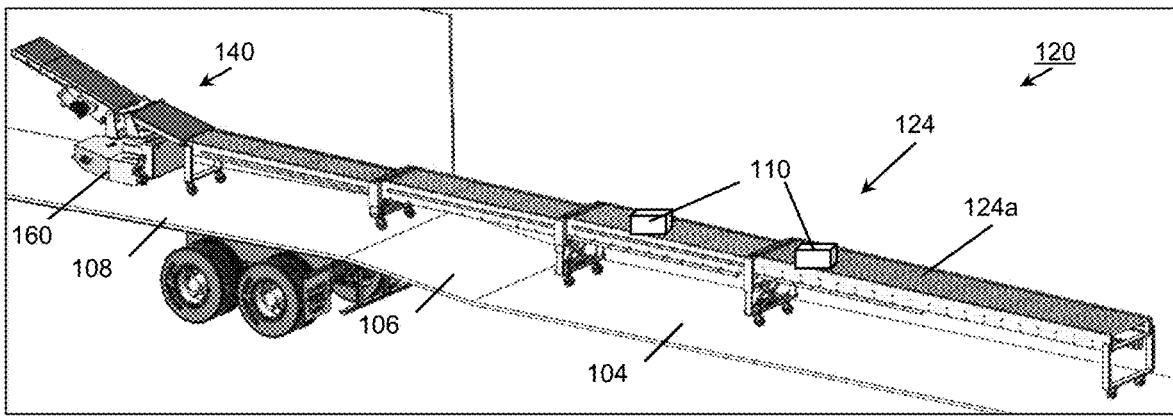
FIGS. 1-6 are exemplary embodiments of various conveyor systems used to load and unload packages from shipping containers and trailers.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Referring initially to FIGS. 1-6, each of the figures is a partially cut-away view of a conveying system 120 that is capable of extending into a truck, trailer or shipping container. For convenience, the term "trailer" will be generally used to refer to any type of truck, trailer or shipping container used to transport objects such as packages, boxes and the like. In each of the figures, a conveying system 120 is illustrated as extending from a shipping dock or warehouse floor 104, across an angled dock levelling plate 106 and into trailer 108. Objects such as packages 110 travel along the top surface of the conveying system. More specifically, the conveying system 120 includes an extendible conveyor 124, which has a driven upper surface to move the objects thereon and that may be extended to span between the floor 104 and inside the trailer 108.

At the end of conveyor 124 is a conveyor interface component 140 mounted upon and/or driven by a modular driving apparatus 160, which may also be employed to extend and retract the conveyor 124. As will be described in further detail below, interface component 140 is adaptable to operate in conjunction with the extendible conveyor. And, modular driving apparatus 160 utilizes a common design that is able to drive (e.g., move and steer) an end of the movable conveyor that is capable of such movement (e.g., not applicable to the fixed-mount conveyor 124*b* of FIG. 3). The traction force of the modular driving apparatus 160, as a combination of its weight and drive components as more specifically discussed below, are important considerations to assure that the modular driving apparatus 160 is capable of moving the end of conveyor 124, particularly when the drive train of such a conveyor is decoupled so that its position is entirely controlled by the attached modular driving apparatus 160.

Figure 2:
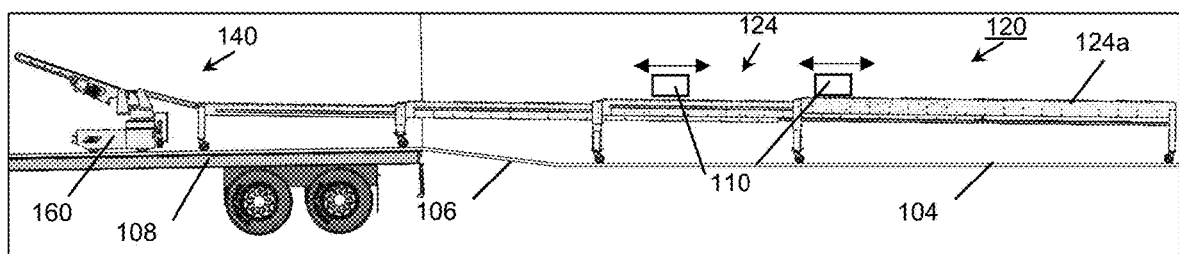
Figure 3:
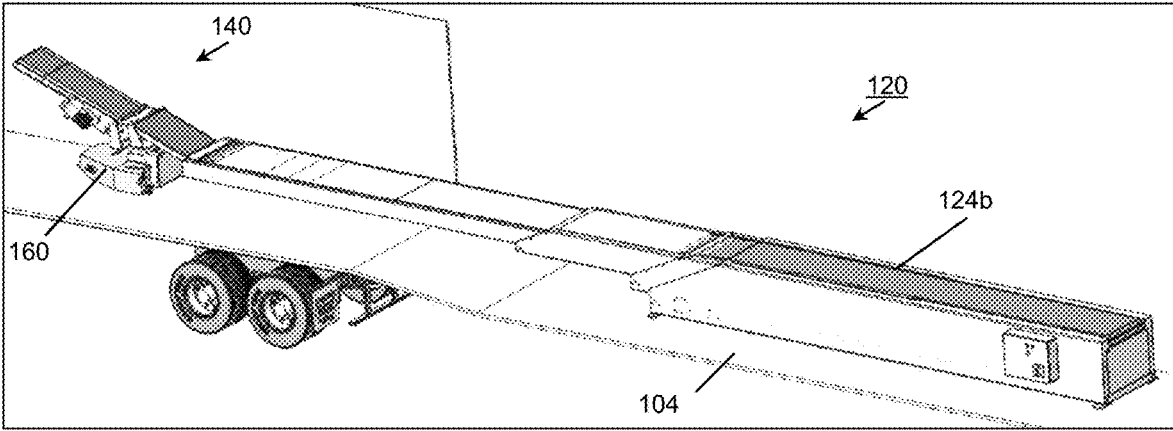
Figure 4:
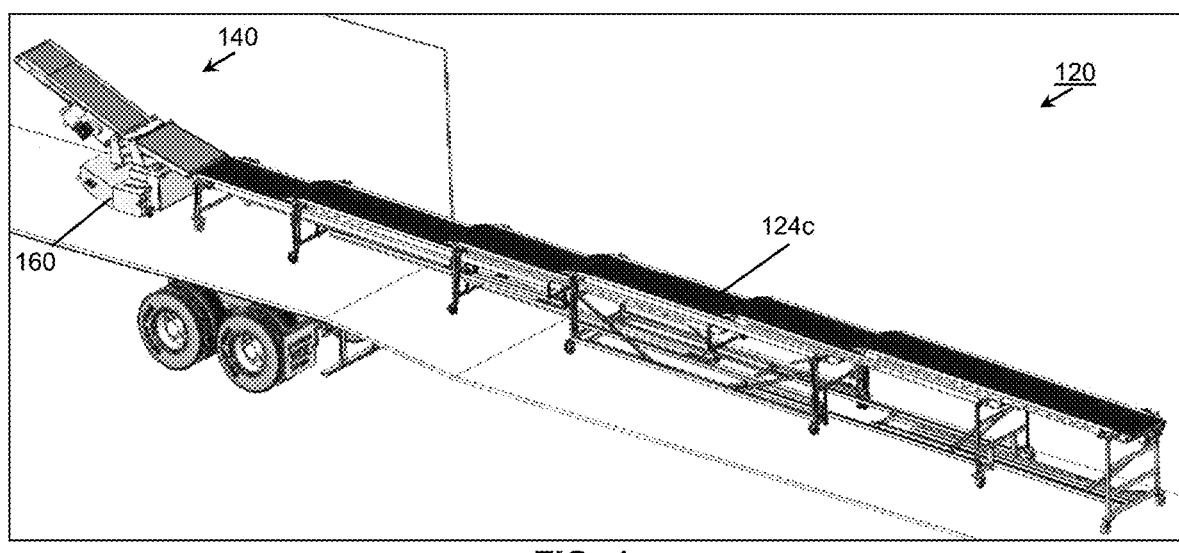
Figure 5:
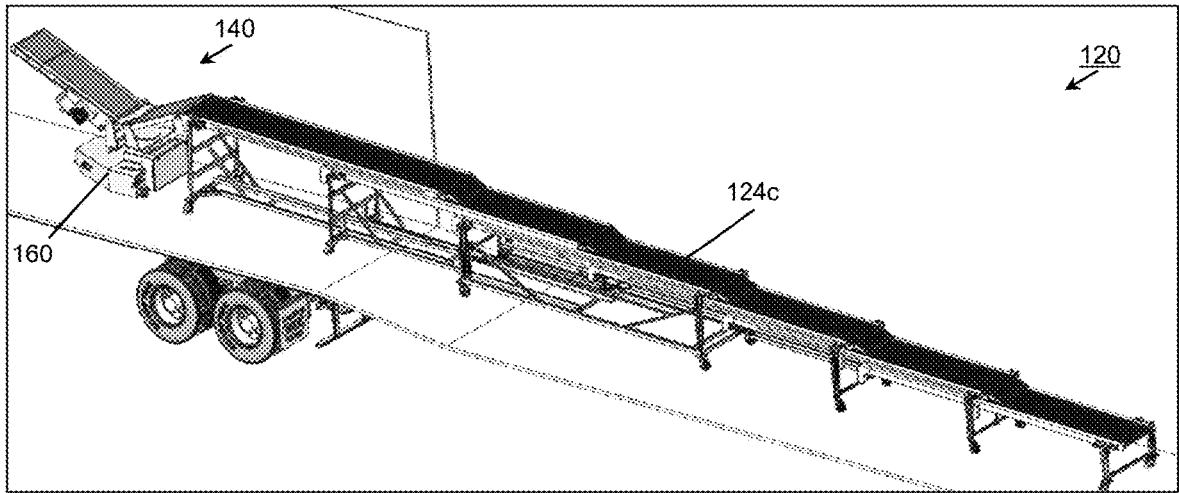
Figure 6:
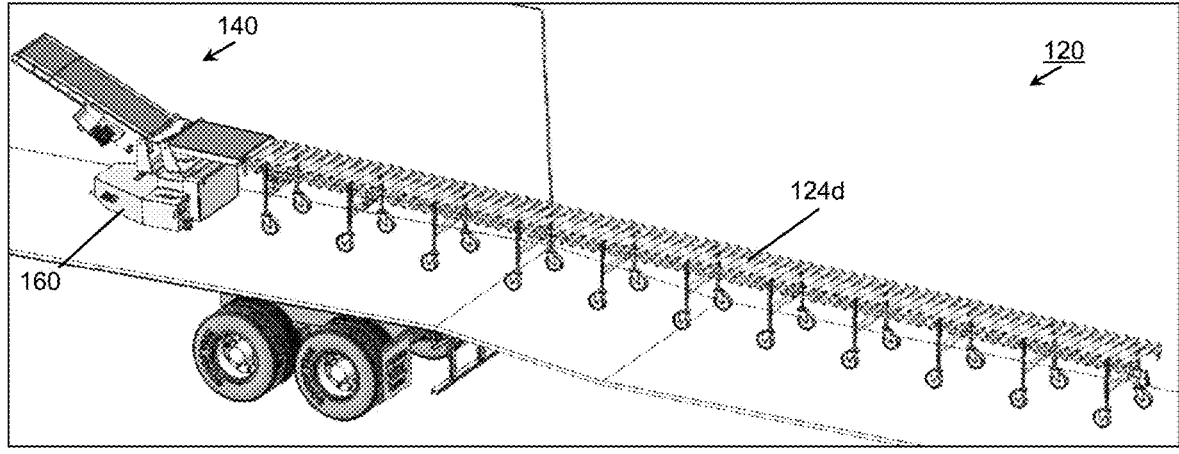

In FIGS. 1 and 2, conveyor 124*a* is a movable telescoping conveyor having a driven-roller surface. Conveyor 124*a* includes adjustable height supports which will be described in further detail below. FIG. 3 depicts a conveying system 120 with a fixed telescoping conveyor 124*b*, where sections progressively telescope from a base fixed to the floor 104. In FIGS. 4-5, a fixed-height telescoping conveyor 124*c* is depicted in a loading configuration in FIG. 4, with objects cascading down into the trailer, and an unloading configuration in FIG. 5, with objects cascading down as they move out of the trailer. Lastly, FIG. 6 illustrates an accordion-style extendible conveyor 124*d* in use in the conveying system 120. It should be appreciated that, depending upon the slope of the levelling plate 106 and the height differential of floor 104 and the bed of trailer 108, the conveying system configurations of FIGS. 3-6 may result in widely variable heights at the trailer end of extendible conveyors 124*b*-124*d*, and the possibility that one or more of the supports of conveyors 124*c*-124*d* may not even be in contact with the floor 104, dock leveling plate 106 or the bed of trailer 108. Moreover, movement of the conveyors 124*c*-124*d* into or out of trailer 108 may be made difficult or impossible when the height differential (or angle of inclination) of the trailer bed is too great. Accordingly, a solution comprising an adjustable height conveyor may be more suitable to handle varying dock and trailer configurations.

As will be further appreciated the variability in telescoping conveyor types and designs, as well as the widely varying angles and positions across the width of the container or trailer present potential issues for movement of extendible conveyors into and within trailers. Moreover, several solutions illustrated in FIGS. 1-6 are particularly suitable to handle varying dock, trailer and telescopic conveyor configurations. Some of the characteristics that may be addressed by solutions that facilitate the controlled extension and movement of the conveyors 124a-124d, particularly with a tight-turning modular driving apparatus 160, may also eliminate or reduce issues with alignment of the conveyor (e.g., within the trailer) and problems with transfers from conveyor section to conveyor section. Other advantages of the disclosed embodiments, particularly those incorporating additional conveying components at the end of the extendible conveyor, such as adjustable conveyors (e.g., height, horizontal angle, vertical angle, etc.) that are operatively connected to the modular driving apparatus 160, may further reduce the need to move or adjust the extendible conveyor as they provide a highly adjustable means to move an object being loaded or unloaded between the operator and the end of the extendible conveyor. Coupled with the small, highly-adjustable features of the modular driving apparatus 160, the adjustable conveyor sections that may be operatively positioned on the driving apparatus facilitate alignment of the conveyor in the first place and "bridge" the gap between the extendible conveyor 124a-124d and the operator in a manner that provide better alignment, including lateral position and height, and also capable of handling different inclines and heights of trailers and containers. As disclosed below relative to FIGS. 53-69, the adjustable height features of extendible conveyor 124a, such as extendible legs (e.g., 528, 558) also facilitate alignment and management of differing heights and angles of the dock floor 104, dock plate 106 and trailer bed 108 surfaces.

Turning next to FIGS. 7-14 the conveyor interface component 140 will be described in accordance with the depicted embodiments. A function of conveyor interface component 140 is to operatively interact with the free end of an extendible conveyor 124 (e.g., 124a-124d) as illustrated in FIGS. 1-6. The conveyor interface component 140 provides a conveying interface for exchanging objects (e.g., packages) with the end of the extendible conveyor, doing so in a coordinated or generally synchronized fashion so as not to mishandle objects, and at the same time be responsive to operator commands, such as stopping and starting the flow of objects on the conveyors.

It should be understood that the configuration of the conveyor interface component 140 is, to a large extent dependent upon the nature of the extendible conveyor 124 to which it provides an ergonomic interface, and that while an embodiment is described, it is possible to modify or substitute alternative components to achieve the desired interface feature(s). In the illustrated embodiments, the interface component 140 includes an adjustable conveying apparatus 200 with at least one pivoting conveyor 210 operatively affixed on the driving apparatus 160. The adjustable conveying apparatus 200 is suitable to exchange objects (e.g., packages) with the extendible conveyor on a first end 204 and with an operator on an opposite second end 206.

More specifically, the conveying apparatus 200 may include a support frame or pedestal 220 operatively attached on the driving apparatus 160. A tiltable transition conveyor section 210 is pivotally coupled to the frame 220 at a first end. In this manner the conveyor section 210 is capable of pivotal movement about a first generally horizontal axis 226. And, on opposing end 204, conveyor section 210 is suitable for exchanging objects with the extendible conveyor 124.

Conveyor section 210 may include a driven surface such as a belt 212, or it may include driven or passive rollers 214.

Figures 10, 11, 12, 13, 14:
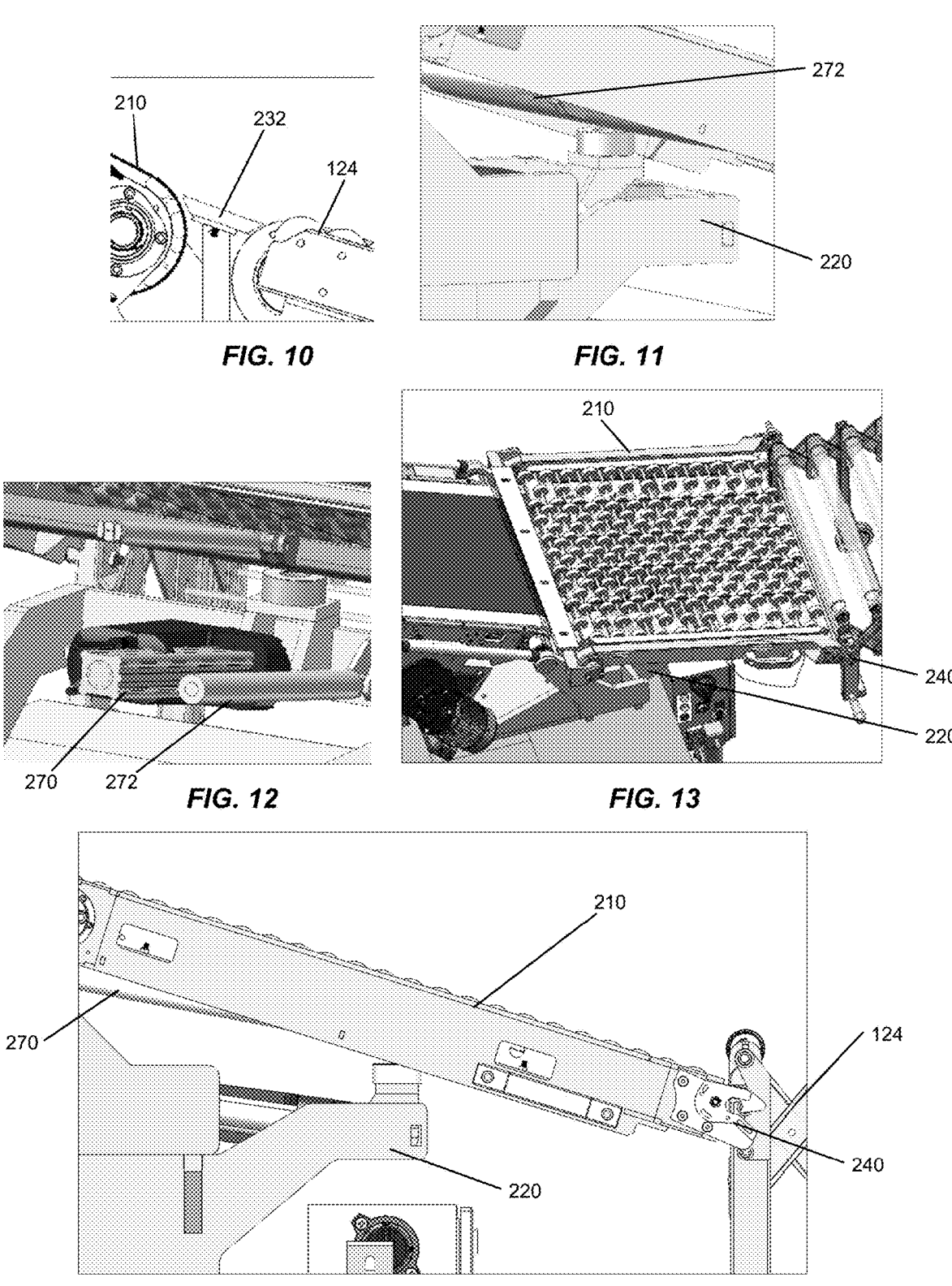
FIGS. 10-14 are expanded views of the conveyor interface component.
Figure 23:
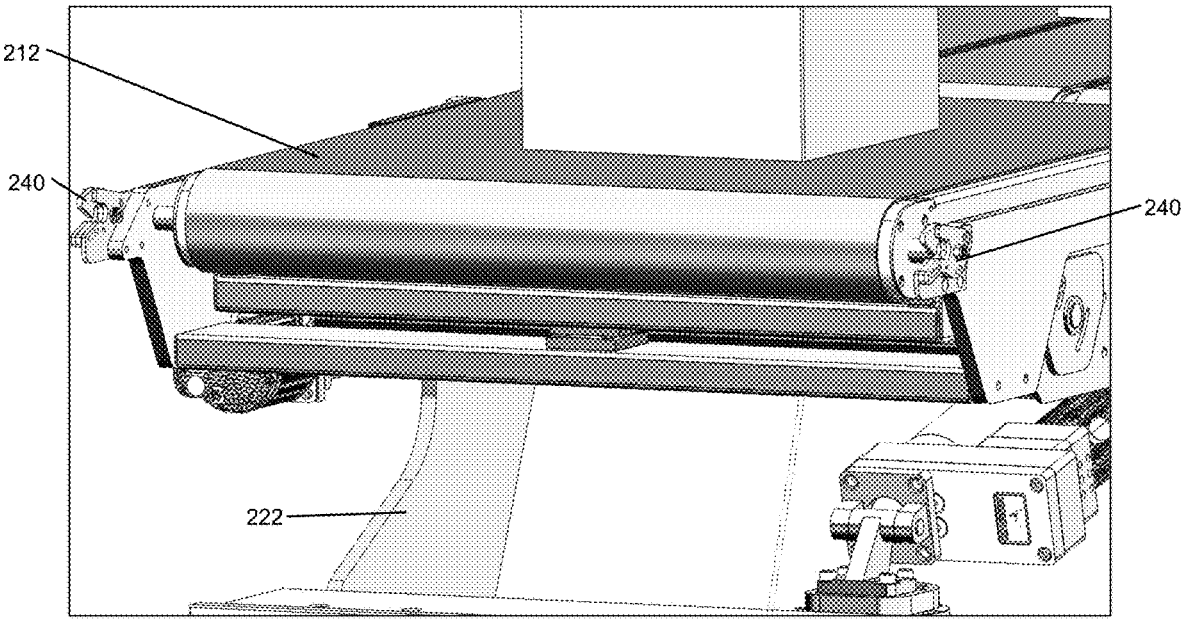

It will be appreciated that there may be various mechanisms with which the conveyor interface component 140 may be operatively attached to the extendible conveyor 124, and FIGS. 13-14 and 23 illustrate one such embodiment where a mechanical latch 240 operates to connect to a pin or bolt extending from the sides at the end of the extendible conveyor. As will be appreciated the mechanical latch 240 is intended to facilitate the attachment and detachment of the modular driving apparatus 160 to the extendible conveyor 124, via pivoting conveyor 210. The pivoting conveyor, in the various embodiments depicted herein, has an adjustable vertical tilt angle and thus is capable of adjusting to the height of the end of extendible conveyor 124, thereby providing a suitable transition for objects passing between the pivoting conveyor 210 and the extendible conveyor 124. And, as illustrated, for example, in FIG. 10, a guard plate 232 (e.g., formed from a resilient material such as a plastic or polymer) may be placed at an angle to accommodate object transfer between conveyor sections of varying height.

Conveying apparatus 200 also includes a pivot frame member 222 pivotally coupled to the support frame 220 for pivotal movement about a generally vertical axis 224. Pivotally attached to the pivot frame member 222 is a slewing conveyor section 260 having a first end 264 pivotally coupled to the pivot frame member 222 for pivotal movement about a second generally horizontal axis 228, and an opposing second end 268 shaped for exchanging objects with an operator (not shown). As illustrated, the first generally horizontal axis 226 and the second generally horizontal axis 228 are maintained by the support frame 220 and the pivot frame 222, respectively, at the same vertical height, so that an object on the upper surface of the respective conveying components may transition from one to the other.

Figure 21:
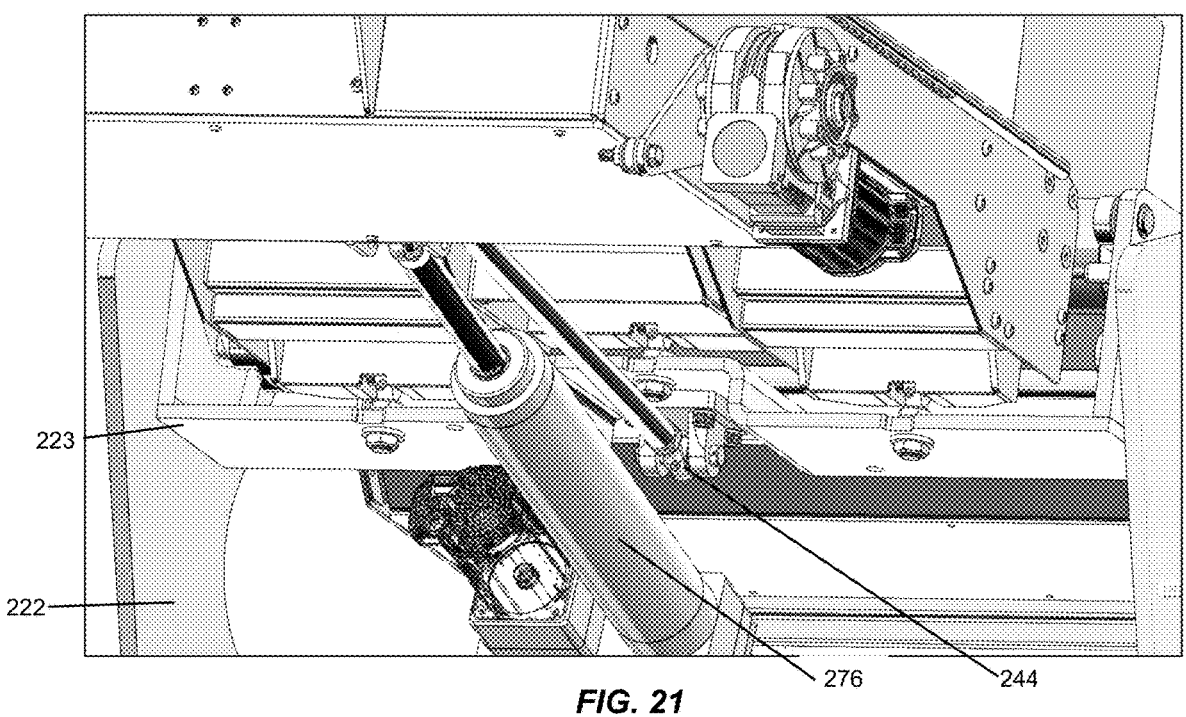
Figure 22:
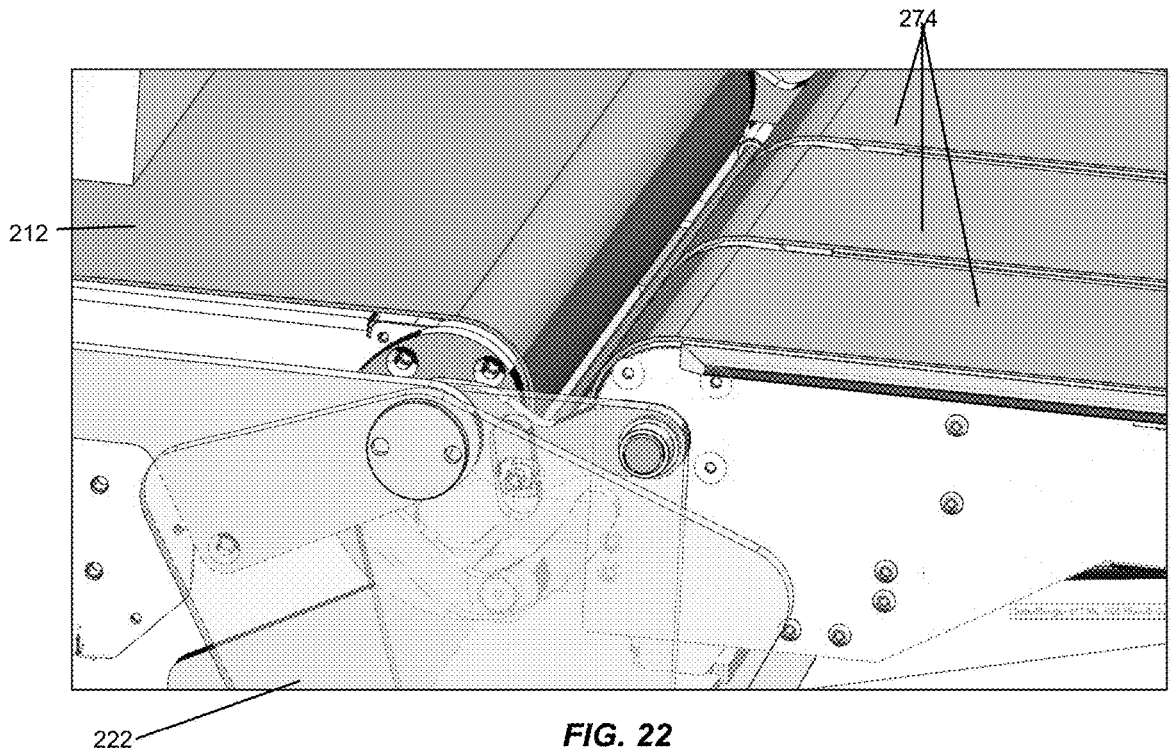

Slewing conveyor section 260 is, as noted above able to pivot relative to support frame 220 on both axes 224 and 228, thereby allowing end 268 to be adjusted to a number of positions suitable for an operator exchanging a conveyed object. The belt 262 is operated under the power of a belt drive motor 266, which is responsive to operator controls and/or integrated conveyor controls. The position (e.g., tilt and yaw) of the slewing conveyor section 260, and the tilt angle of conveyor section 210 are maintained through the use of a mechanical actuator(s) 270, 276 supporting the weight of the conveyors and allowing for position adjustment to load and/or unload packages efficiently, as partially illustrated in FIGS. 11, 12 and 21. Also understood is that the mechanical actuators may be supplemented with or replaced by manual mechanical adjustment mechanisms, gas filled struts (e.g., 272), mechanical counterweight mechanisms, mechanical spring mechanisms, pneumatic actuators, hydraulic actuators, motor driven actuators or other electromechanical means for controlling the orientations of conveyor sections 210 and 260. In one embodiment use of a polymer belt, with nubs on the back side that engage large sprockets, presents an opportunity to use an end drive for bi-directional transfer rather than the more complex center drive illustrated. The nubs and large sprockets ensure no tracking issues as well as result in cost reduction. The belt nubs are guided along the conveyor length by wear strips which resists side loading from objects (e.g., packages).

Figure 47:
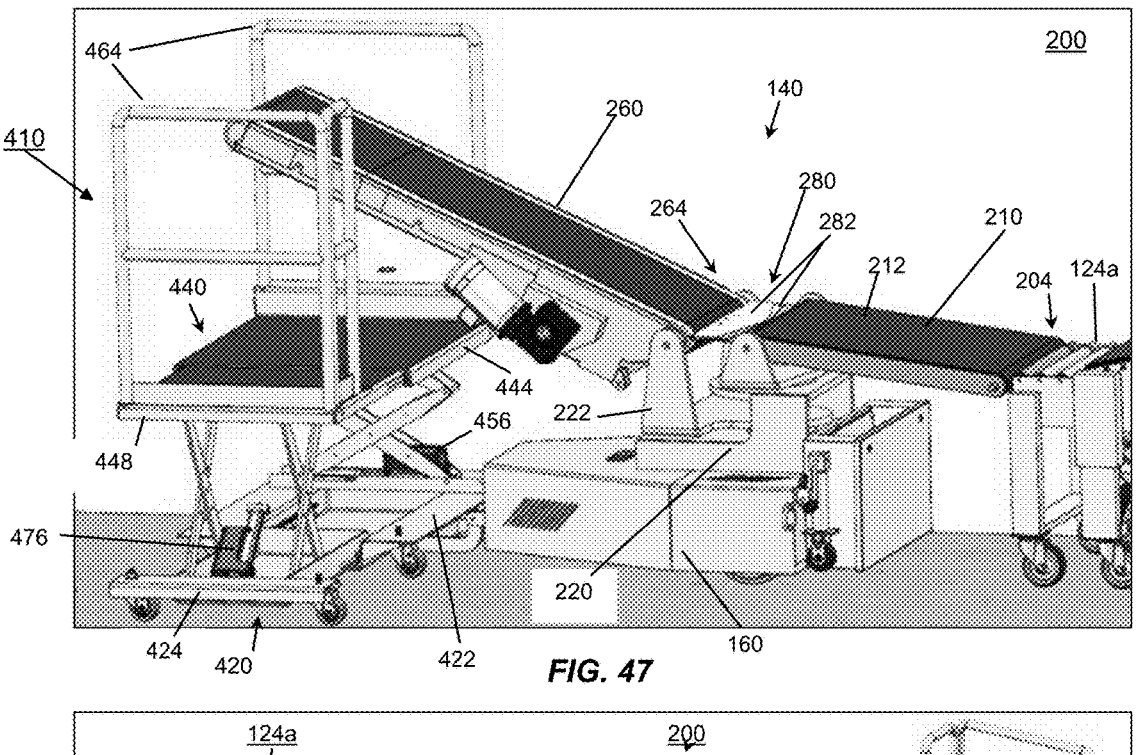
Figure 48:
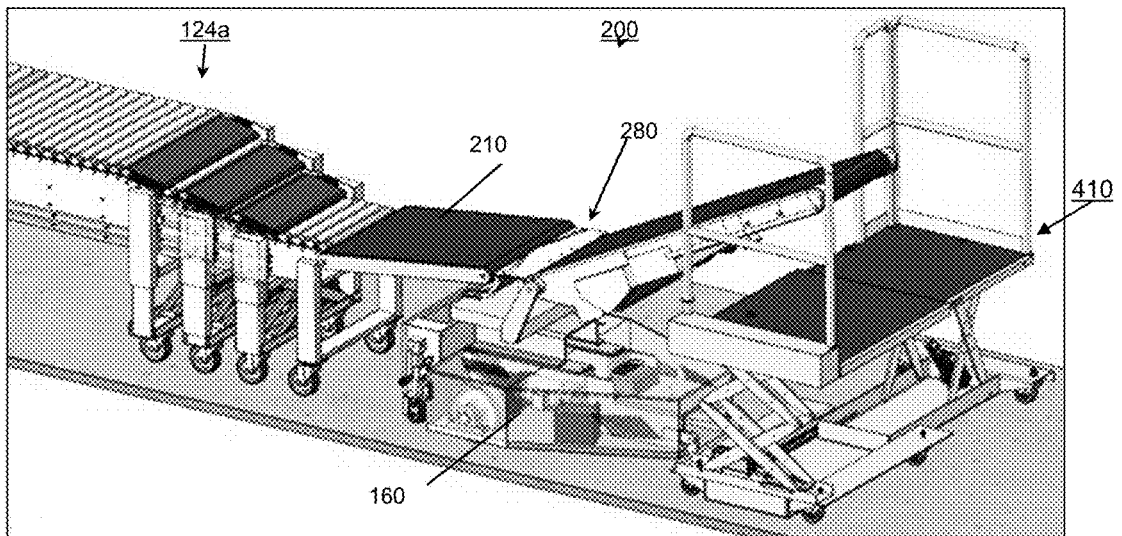

Also contemplated, as illustrated in FIGS. 7 and 47-48 for example, is a transition assembly 280 including a plurality of interconnected plate sections 282 that are slidable relative to one another. The transition assembly 280 is operatively attached between the support frame 220 and the pivot frame 222 to span a gap between the first end of the tiltable transition conveyor 210 and the first end 264 of the slewing conveyor 260 and prevent an object from falling through the gap. The plates 282 are operatively maintained along a general plane by fasteners that permit the plates to slide and/or pivot relative to one another and the adjacent conveyor surfaces.

Figure 19:
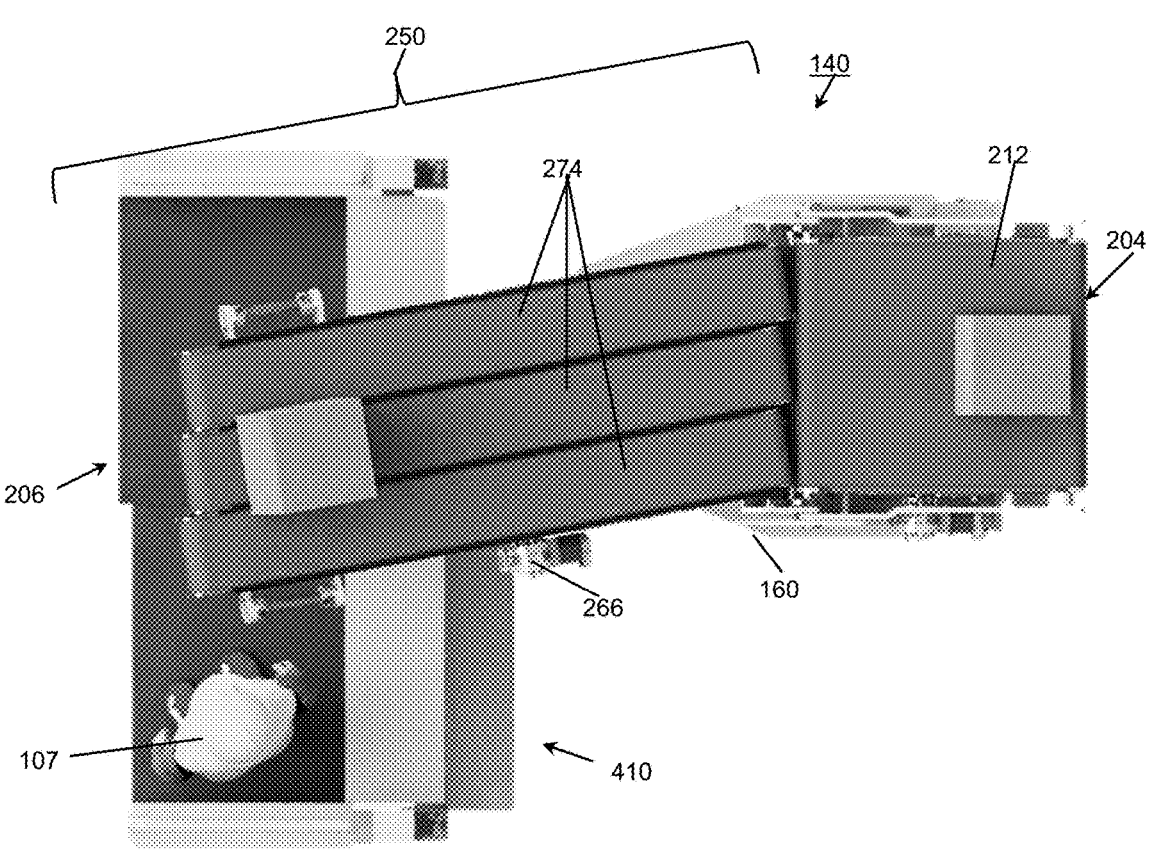
Figure 20:
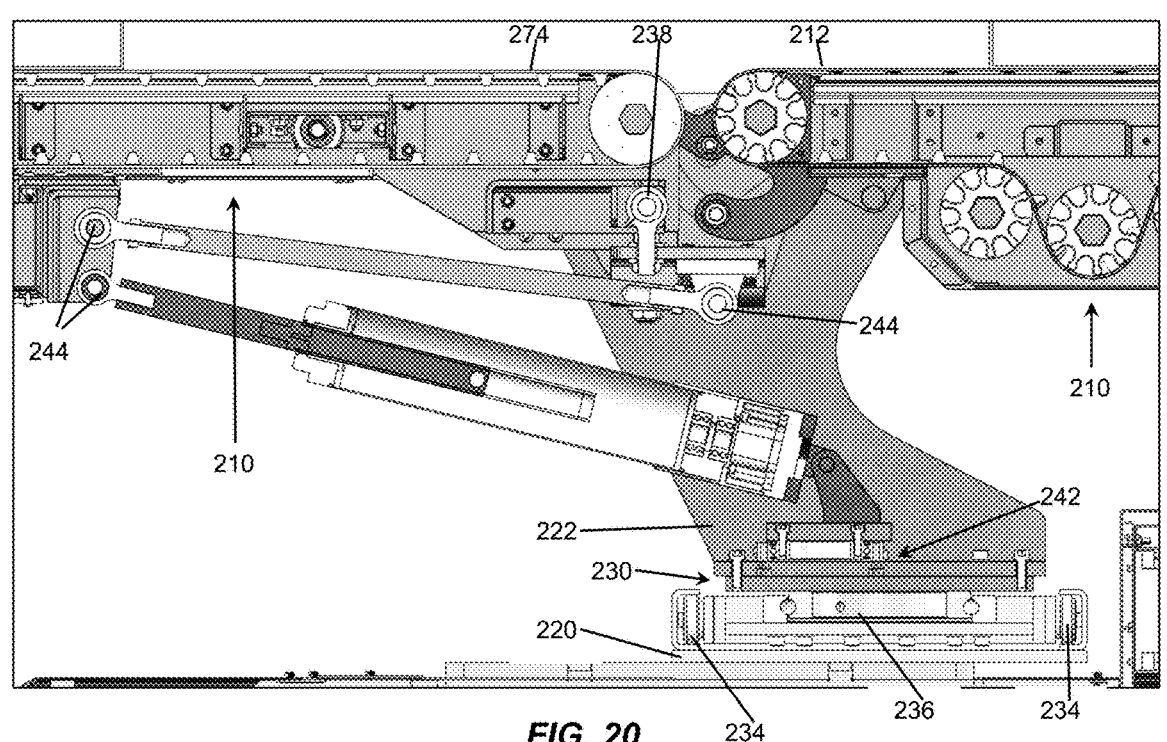

Turning now to FIGS. 15-23, depicted therein is an alternative embodiment for conveyor interface component 140. As previously noted, conveyor interface component 140 is intended to operatively connect to and interact with the free end of an extendible conveyor 124 (e.g., 124a-124d) as illustrated in FIGS. 1-6. The conveyor interface component 140 provides a conveying interface to exchange objects such as packages (e.g., boxes, bags, etc.) with the extendible conveyor, doing so in a coordinated or generally synchronized fashion so as automatically accomplish the transition to/from the extendible conveyor 124 and avoid mishandling objects, and at the same time be responsive to operator commands, such as stopping and starting the flow of objects on the conveyors. Depicted in FIGS. 15-23 are alternative embodiments of the conveyor interface component 140 and associated modular driving apparatus 160, in particular an alternative attachment pedestal 220 that may be employed on the modular driving apparatus 160. In one embodiment, platform 220 includes a mid-support 230 that while operatively connected atop the pedestal or platform 220, is able to be pivoted and/or swiveled relative to the platform 220 and modular driving apparatus 160. Mid-support 230, as depicted in FIG. 20, is also able to laterally slide on rollers 234 relative to the platform 220. And the mid-support frame 230 further includes a central pivot bearing 236 that allows the mid-support frame 230 to pivot about a vertical axis. As will be appreciated the mid-support 230, having the capability to adjust position via swivel and/or lateral slide facilitates the adjustable positioning of the conveying systems supported on the mid-support.

In the embodiment of FIGS. 15-23, the configuration and position of the conveyor interface component 140 is dependent upon the type, position and configuration of the extendible conveyor 124. One function of the conveyor interface component 140 is to provide an ergonomic interface at the end of the extendible conveyor, as well as to facilitate controlling and adjusting the position of the extendible conveyor within the confined space of a truck, trailer or container. Referring to FIGS. 15-23, interface component 140 includes an adjustable conveying apparatus including one pivoting belt-type conveyor 210 and multi-conveyor assembly 250 (including a plurality, and preferably at least three parallel belt conveyors), both the pivoting belt-type conveyor 210 and the multi-conveyor assembly 250 being pivotally attached (about a vertical axis) to the frame 222 located on the pedestal 220 of driving apparatus 160. In one embodiment, frame 222 is also slidably attached to the pedestal 220. The pivotable and/or slidable attachment of mid-support 230 and frame 222 relative to pedestal 220 assures that the conveying apparatus may be suitably adjusted to both interact with the end of the extendible conveyor on end 204 and to interface with an operator at end 206. As described in more detail relative to FIGS. 70 and 71, the conveying apparatus may further include a user-interface device that is capable of controlling not only the conveying apparatus, but the movement of the driving apparatus 160 as well as the extendible conveyor to which it is attached. The adjustable conveying apparatus is suitable to exchange objects with the extendible conveyor on a first end 204 and with an operator positioned adjacent an opposite second end 206 to place objects on or pick objects from triple-belt conveyor assembly 250. The multi-conveyor assembly 250 of the conveying interface 140, provides at least three driven belts 274 that are driven in unison with one another by motor 266. The multi-conveyor assembly is vertically pivotable about a horizontal axis 228, and is swingable in a left-right horizontal direction to cover a sizeable arcuate range 278 of approximately 1.0 meters horizontally and 1.4 meters vertically.

More specifically, the conveying apparatus depicted may include a support pedestal 220 operatively attached on or to the driving apparatus 160. The tiltable transition conveyor 210 is pivotally coupled to the frame 222 at a first end. In this manner the conveyor section 210 is capable of pivotal movement about a first generally horizontal axis 226. And, on opposing end 204, conveyor 210 is adjustable to a height suitable for exchanging objects with the extendible conveyor 124. Conveyor 210 may include a driven surface such as a belt 212, or it may include other driven components capable of moving objects thereover.

Figures 15, 16:
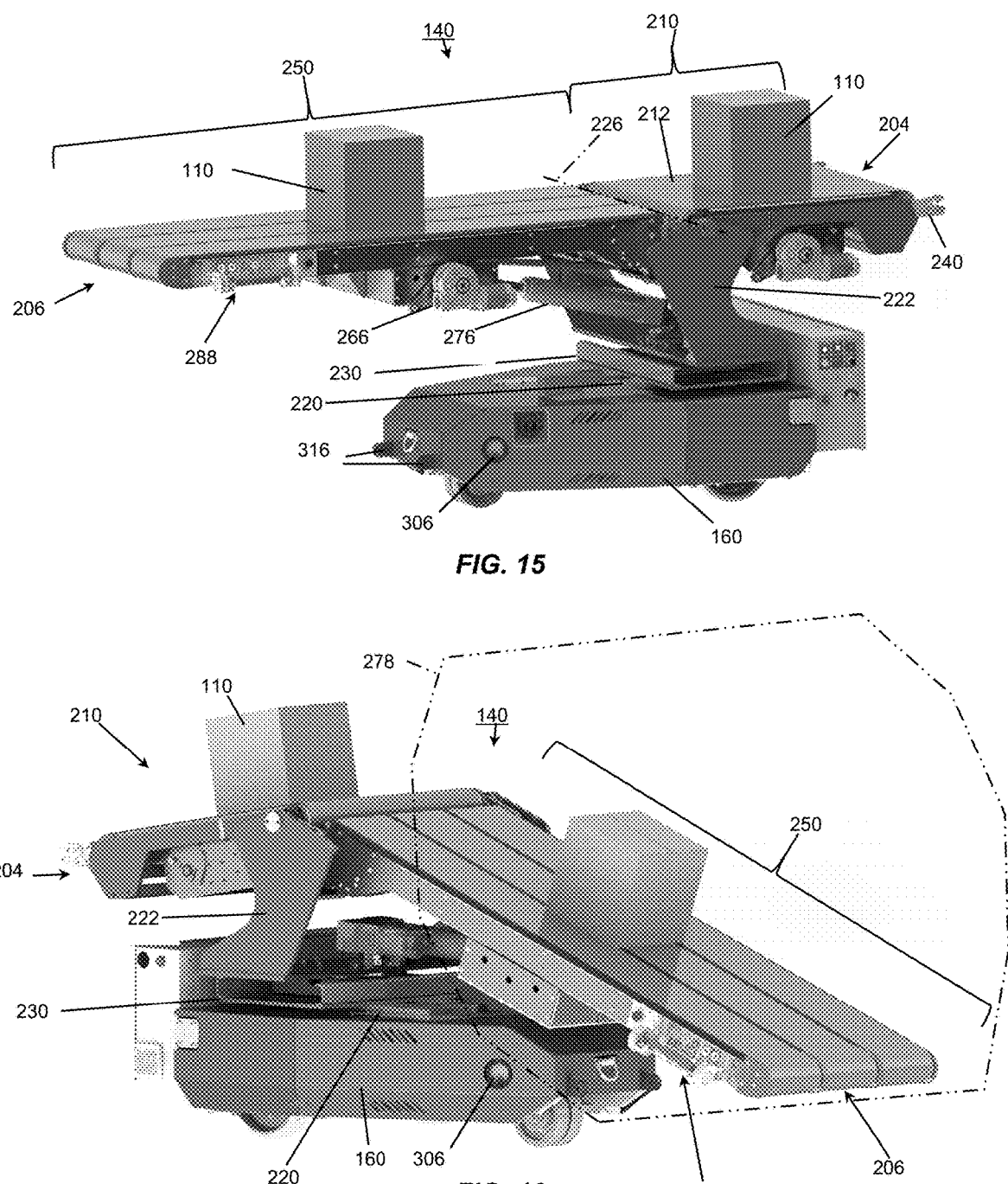
FIGS. 15-23 are views of an alternative conveyor interface component.

It will be appreciated that there may be various mechanisms with which the conveyor interface component 140 may be operatively attached to the extendible conveyor 124, and FIG. 15 illustrates one such embodiment where a mechanical latch 240 operates to connect to a pin or bolt extending from the sides at the end of the extendible conveyor 124. As previously described the mechanical latch 240 is intended to facilitate attachment and detachment of the conveyor interface component 140 and its modular driving apparatus 160 to the extendible conveyor 124. The tiltable transition conveyor section 210 of the conveyor interface component 140 has self-adjusting vertical tilt angle, and thus is capable of adjusting to the height of the end of extendible conveyor 124, thereby providing a suitable transition for objects passing between the transition conveyor section 210 and the extendible conveyor 124. Because of the close alignment of the transition conveyor section 210, and its driven belt configuration (see e.g., FIG. 20), belt 212 is capable of exchanging objects with the extendible conveyor 124 over angle in the range of about −20 degrees to +20 degrees.

Pivotally attached to the frame member 222 is a slewing or multi-belt conveyor assembly 250 having a first end 264 pivotally coupled to the frame member 222 for movement about a second generally horizontal axis 228, and has an opposing second end 206 shaped for exchanging objects with an operator (not shown). As illustrated, the first generally horizontal axis 226 and the second generally horizontal axis 228 are maintained by the support frame 220, respectively, at the same vertical height, so that an object on the upper surface of the respective conveying components may transition from one to the other.

Figures 17, 18:
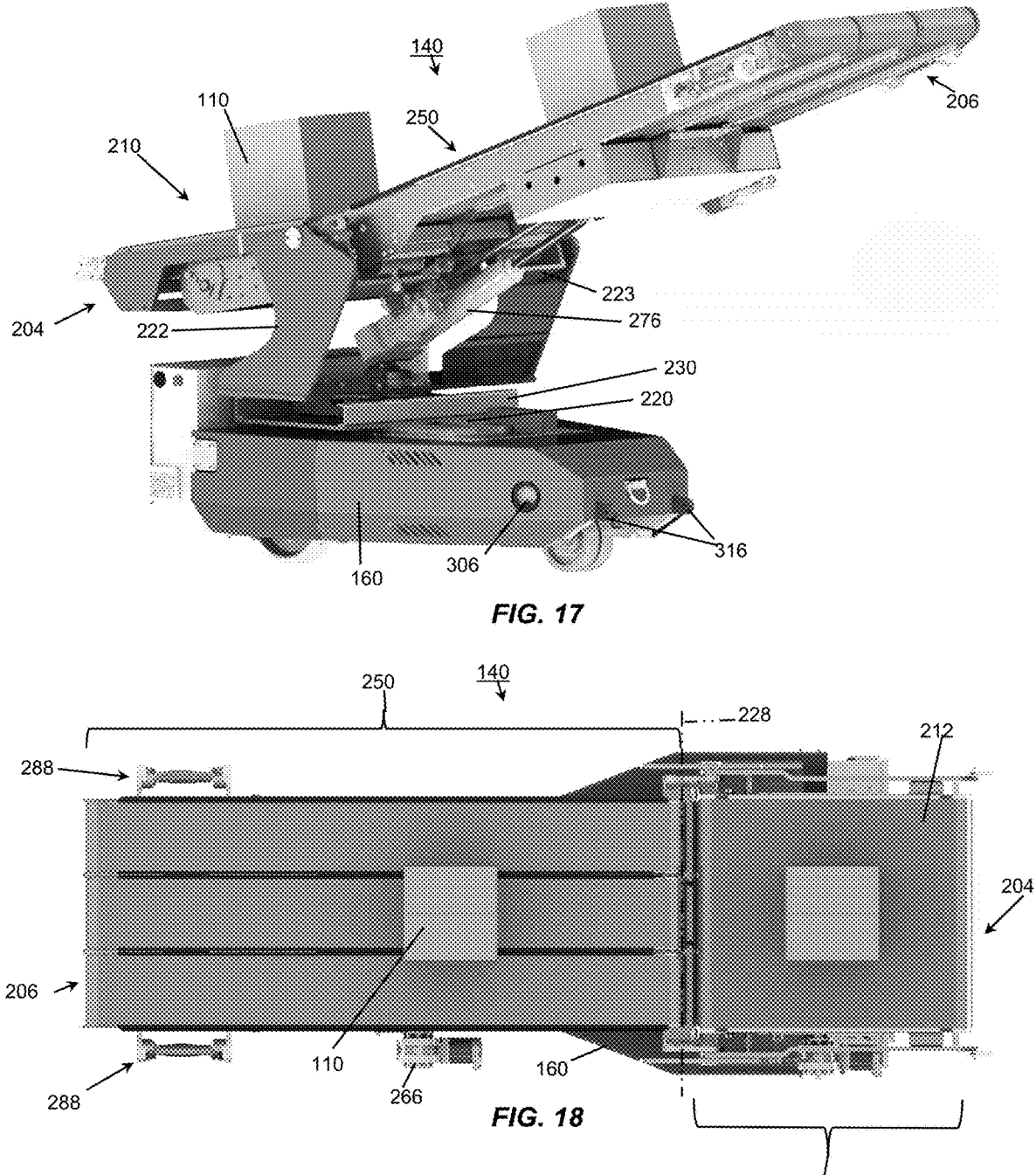

The multi-belt conveyor assembly 250 is, as illustrated in FIG. 19, further able to alter the relationship of the individual belts 274 in order to allow the assembly to swing to the left or right. thereby allowing end 206 to be adjusted to a number of positions suitable for an operator exchanging a conveyed object. The belts 274 are operated under the power of one or more belt drive motors 266, which are responsive to the operator controls and/or integrated conveyor controls. The position (e.g., tilt and yaw) of the triple-belt conveyor assembly 250, and the are maintained through the use of linear actuator 276, as illustrated in FIGS. 15-17, under the control of the controls as described relative to FIG. 71. Although not specifically illustrated, it is also understood that other electro-mechanical means for controlling the orientation of multi-belt conveyor assembly 250 may be employed. As represented in FIG. 20, each of the multi-conveyor frame assemblies is supported on a ball joint connection 238 to the pivoting frame bracket 223. The ball joint is unique by translating the dead weight force (from gravity) of the conveyor straight down in the vertical direction though the center of the ball as well as opposing the direct in-line force component (from gravity). This is an important feature that allows the operator to slew the conveyor side to side without feeling any resistive forces due to gravity. The operator grabs the handle on control 288 to release the brake and manually repositions the multi-belt conveyor efficiently and without ergonomic strain. This manual motion ensures safety as well as speed for adjustment. Swivel joint 242 and ball joints 244 also contribute to a stable condition of the multi-belt conveyor assembly 250 at all slewing angles.

Figure 24:
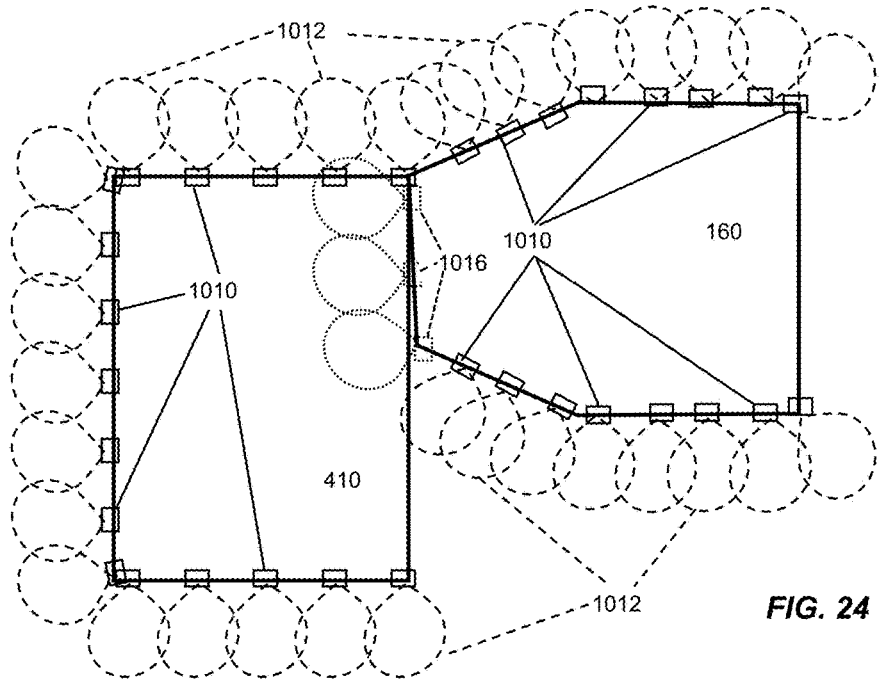
FIG. 24 is a schematic illustration of conveyor interface components and associated sensor arrays in accordance with an aspect of the disclosed embodiments.

Considering FIG. 24, depicted therein is a schematic diagram of sensors 1010 applied as an array about the periphery of the conveyor interface component including modular driving apparatus 160 and operator platform 410. While it may be possible to employ one or a few sensors that cover a wide area around the modular driving apparatus 160 and/or the operator platform 410 in one embodiment a plurality of sensors 1010 (e.g., ultrasonic sensors) are spaced around the periphery of one or both components 160 and 410, to provide the area coverage as illustrated by the ultrasonic fields 1012. An array of sensors is placed around the modular driving apparatus 160 and/or operator platform 410, with a plurality of sensors 1016 that may be deactivated when the driving apparatus is connected to the operator platform 410 in order to avoid false detection of the platform when adjacent the driving apparatus 160. When platform 410 is operatively connected, it's sensors form part of the sensing array about the entirety of conveyor interface component 140. The sensors may be ultrasonic sensors such as I2CXL MaxSonar available from Maxbotix. The following table represents actual data for the sensor output in response to a wall at different separation distances:

| DISTANCE (m) | OUTPUT VOLTAGE (V) |
| --- | --- |
| 1.0 | 1.29 |
| 1.5 | 1.77 |
| 2.0 | 2.26 |
| 0.5 | 0.78 |
| 0.75 | 1.04 |
| 1.0 | 1.3 |
| 0.5 | 0.78 |
| 1.5 | 1.78 |
| 2.0 | 2.27 |
| 0.25 | 0..53 |

As will be appreciated from the data, the sensors 1012 "measure" distance to the object and provide an analog reference signal proportional to the distance.

The sensors detect walls, people and other objects within the field of view 1012 of the sensor, and the field overlap is intended to facilitate using the output of multiple sensors to provide decision making data. Not only is the sensor data used for sensing of obstructions, but for guidance while in motion, where the data will be used to understand the position of the machine inside the truck, trailer, or container. The data enables the conveyor interface system to identify its proximity to the walls of the trailer. Hence, travel motion is improved through use of these sensors to slow down and stop modular driving apparatus 160 when approaching people or objects. Moreover, during forward and reverse travel, steering will be controlled by a controller, such as a programmable logic controller (PLC) based on data from the sensors. The sensor data may be further employed to provide visual and audible annunciation alarms when the platform 410 or driving apparatus 160 moves to close to a person or object. For example, the walls of the trailer are used as the target during travel. Trailer widths are standardized and, therefore, accurate position and orientation of the machine and available clearances can be monitored in real time using sensors. In summary, the sensors 1012, or equivalent sensing functionality, emit signals that allow the controller to provide travel assist monitoring during manual, operator requested, travel of driving apparatus 160. For example, the sensors monitor conditions while the operator is manually driving and steering. The sensors will override the operator in order to slow down or stop to avoid objects. The sensors also provide input to the controller to prevent the start of motion if an object is present. Sensors 1012 further contribute to the safety of operators and protection of equipment and product. Accordingly, the sensors and the auto-steering assist supports consistent, efficient and safe performance with a large number of operators.

Figure 25:
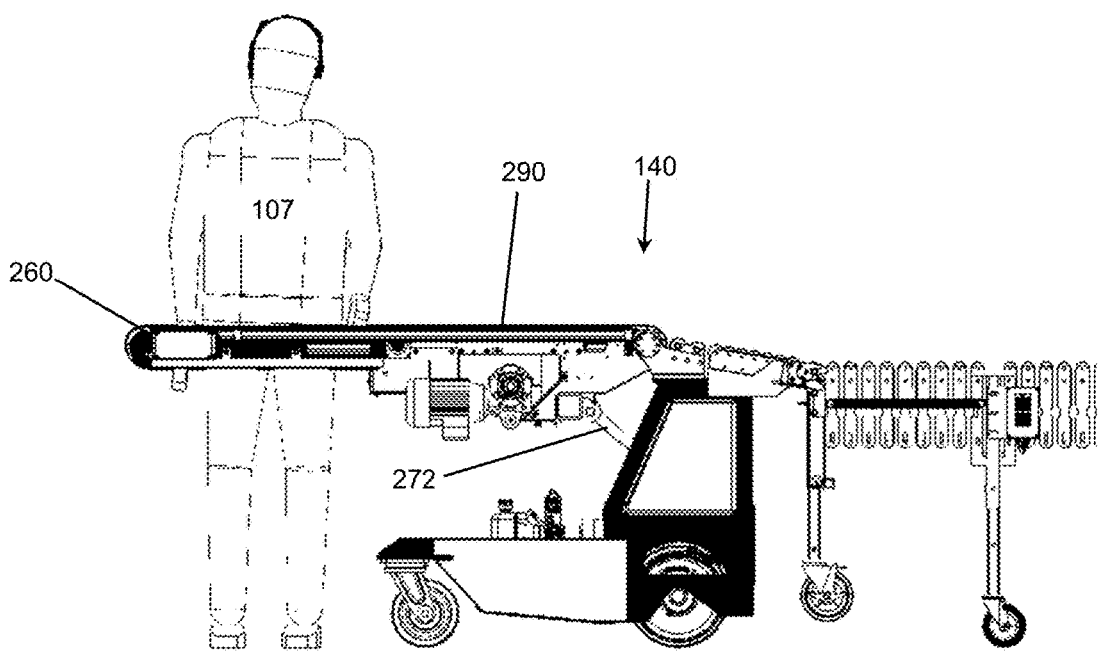
FIGS. 25-26 are concept views of an alternative embodiment of a conveyor interface component, illustrating operator interaction.
Figure 26:
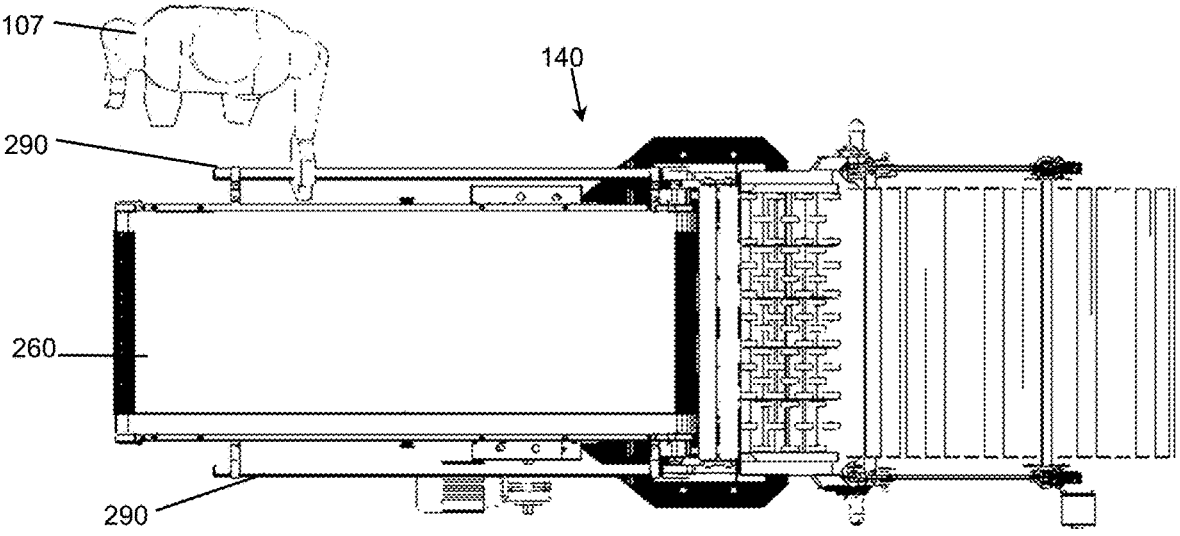

Briefly, FIGS. 25-26 provide views of an alternative embodiment of a conveyor interface component 140 that illustrates an operator 107 grasping an electromechanical apparatus for operator interaction with the conveyor interface component. More specifically, the electromechanical apparatus includes an elongated handle 290 on either side of the slewing conveyor section 260 may be employed. Handle 290 may be responsive to an operator's grip as illustrated, and is configured with sensors to sense not only the force exerted by the operator in the manner of a joystick, but a twisting motion as well that may adjust the speed at which a particular movement is accomplished. For example, the operator pushing the handle 290 away will move conveyor interface component 140 away from the operator, and pulling the handle toward the operator will move the conveyor interface component toward the operator. If the operator moves the handle left or right (e.g., along the longitudinal axis of the handle), the conveyor interface component 140 moves backward or forward, respectively. As will be appreciated, there may be additional movements that are sensed, for example, up and down forces to adjust the tilt angle of the slewing conveyor section 260. Also contemplated are a plurality of buttons, rocker switches and the like suitable for providing similar operator input to move and position the conveyor interface component 140, as well as extendible conveyors and other operatively connected components.

Having described the conveyor sections of the conveyor interface component 140, attention is now turned to FIGS. 27-33 where various perspective, cutaway and detailed views are found for an embodiment of the modular driving apparatus 160. In one embodiment, modular driving apparatus 160 includes a frame 310 including a front end 312 and a back end 314. First and second independent drive wheels 320 and 322, are pivotally connected to the frame along a common axis 324, and each drive wheel is operatively connected to a respective one of first and second independent drive motors, 330 and 332 attached to the frame adjacent the back end. To engage the floor 104 plate 106 and the bed of trailer 108, a portion of each drive wheel extends below the bottom of the frame for frictional contact. First and second gearboxes 334 and 336 connect the first and second independent drive motors 330 and 332 to the respective first and second independent drive wheels 320 and 322. As independently driven wheels, they are positioned to provide 180-degree turning for the modular driving apparatus 160 about a vertical axis generally located mid-way between the drive wheels. While the apparatus may be capable of a full 360-degree turning, its operation is intentionally limited to 180-degrees in order to avoid undue stress being applied to the extendible conveyor and other components that may be attached to or moved by the driving apparatus. On the front end 312 of the frame is attached at least one caster wheel 318, at a position spaced apart from the common axis of the drive wheels, where the caster wheel also has a portion extending below the bottom of the frame. The motor control (not shown, within control panel 308) for the drive motors 330 and 332 are capable of providing controlled towing power at low speed including precision powered steering and 180-degree turning as noted above. Furthermore, the wheelbase pattern where the front caster 318 is centered and located away from operating handles protects operator's feet. The combination of gearing design for the gearboxes 334 and 336 and the controls further provide failsafe travel braking power and holding power on inclines and declines, via high-torque, low-speed control. The motor control provides variable speed as well. And, the use of independent axles for each of the drive wheels allows for active steering and maneuvering on uneven surfaces.

Figures 27, 28, 29, 30, 31:
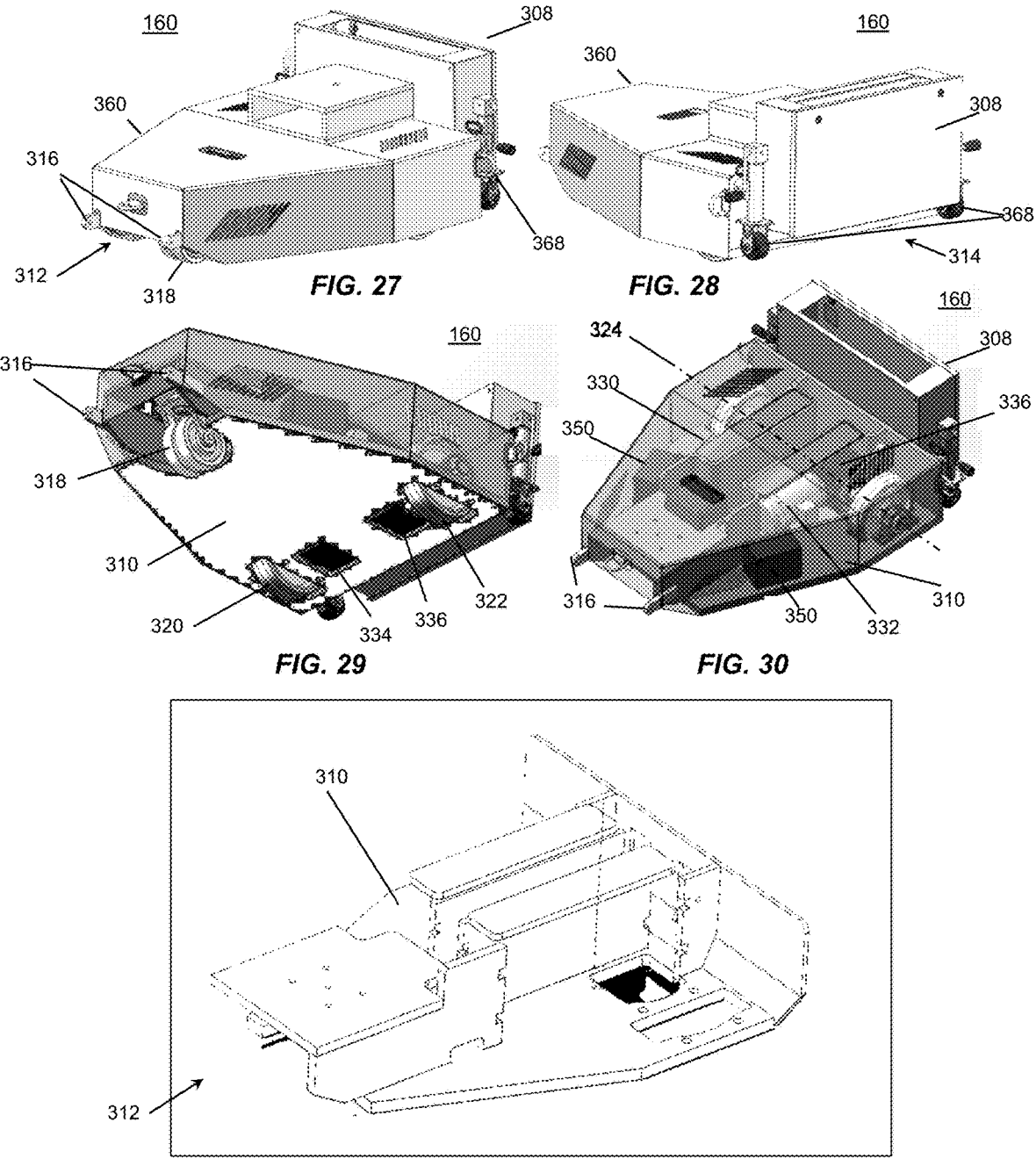
FIGS. 27-33 are various perspective, cutaway and detailed views of a modular driving apparatus in accordance with an embodiment disclosed herein.
Figure 33:
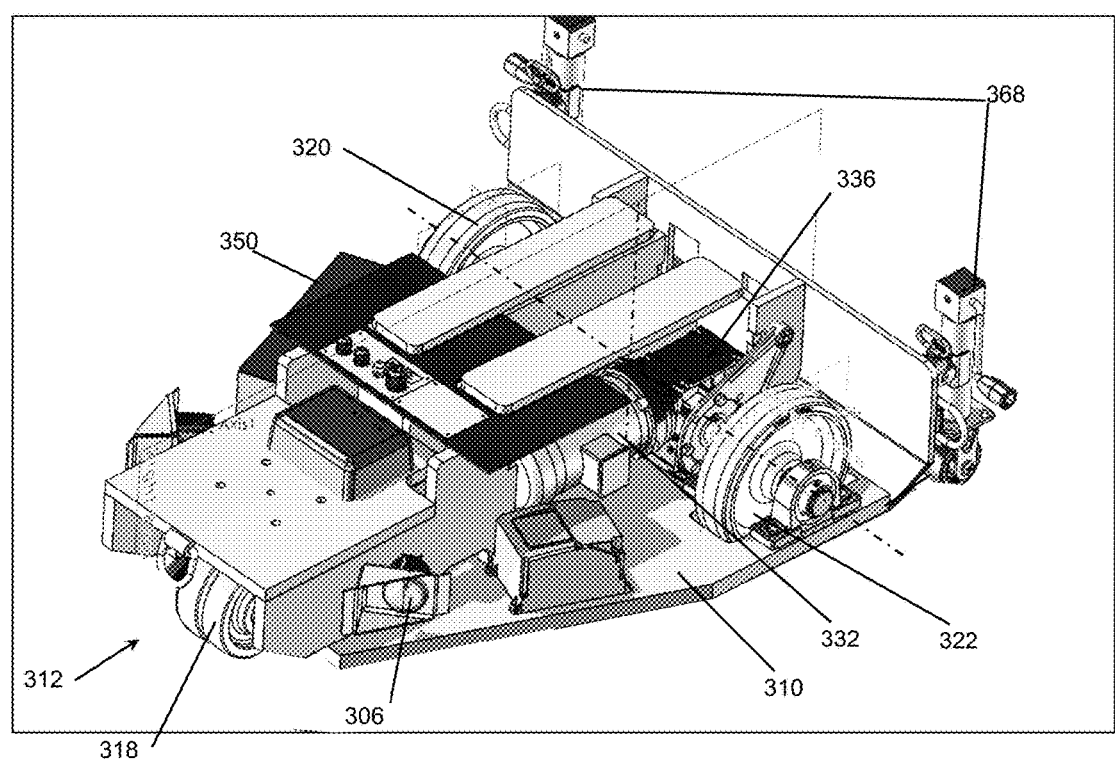
Figures 34, 35, 36, 37, 38, 39:
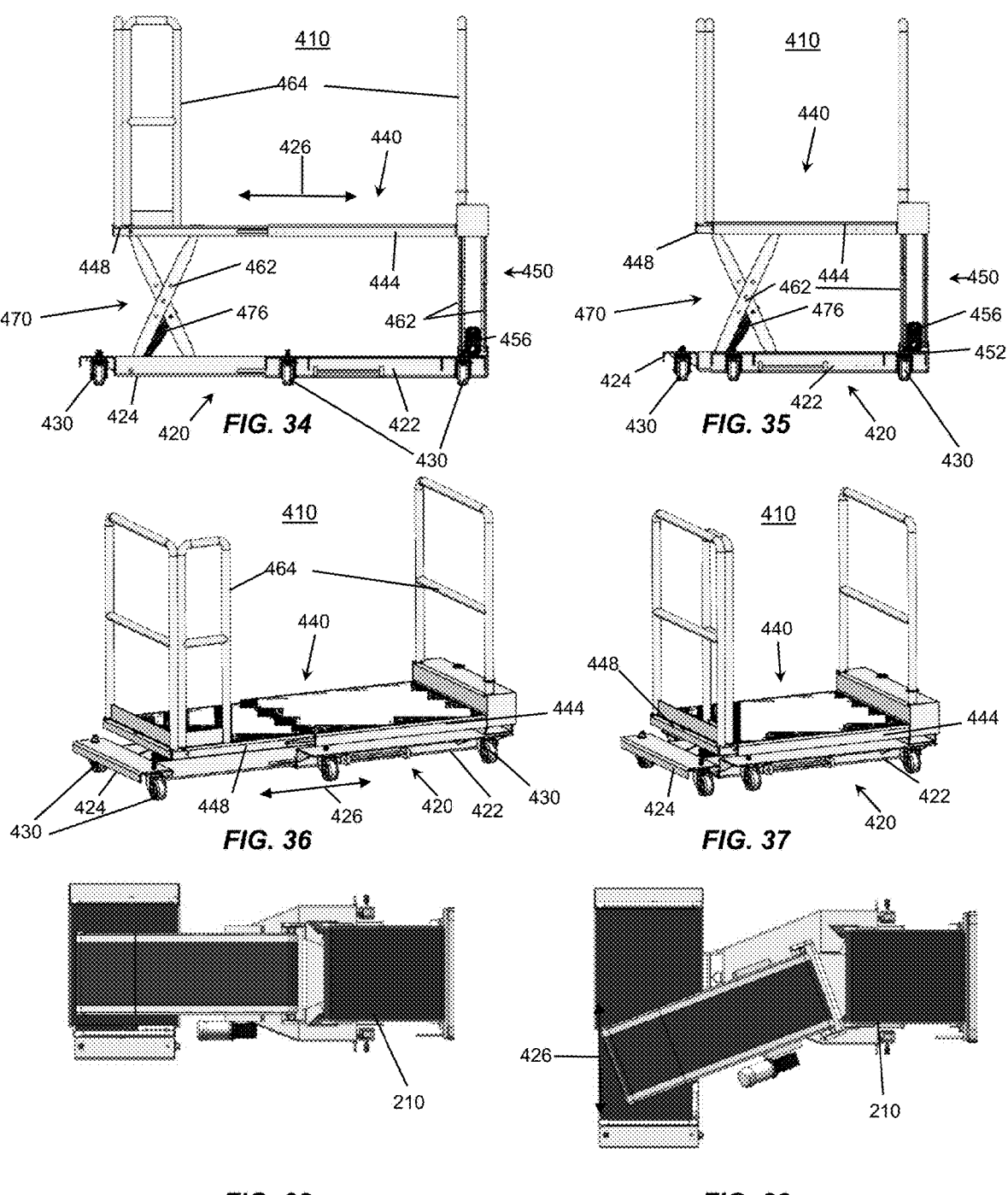
FIGS. 34-37 are views of a movable operator platform featuring adjustable width and height.
FIGS. 38-39 are top views of the movable operator platform.

Although various sources of power may be provided, the embodiment depicted includes a power source(s) 350 providing power to operate each of the first and second independent drive motors 330 and 332. In one embodiment, power source 350 includes a rechargeable battery or similar energy storage device as well as controls for regulating a recharge cycle. Also contemplated is power is continuously provided via cabling strung through extendible conveyor 124. The drive motors operate in response to control signals from the operator. The driving apparatus 160 further includes a mechanical assembly or upward-facing extension of the frame 310 to which one or more conveyor interface components described above may be operatively attached. Frame 310, as more specifically illustrated in FIGS. 31 and 33, is a counterweight frame designed with heavy plates that make up a counterweight centered over the wheelbase. The mass of the frame 310 provides for traction capacity at the drive wheels 320 and 322, as well as stability in a low center of mass relative to components that may be located on top of the driving apparatus 160.

Alternative means for driving the modular driving apparatus 160 are also possible. In one alternative embodiment, a single drive wheel may be employed that is capable of changing the drive direction around a vertical axis, in order to drive the apparatus on a pair of casters, Such a configuration may further include one or more non-driven wheels that a spring-biased downward to provide stability to the frame 310. Other options for driving the modular driving apparatus 160 may include three omni-directional drive wheels with three associated drive motors. Or, two steerable omni-directional wheels, two drive wheels driven by a single motor. As will be appreciated alternative combinations of driven, non-driven and steerable wheels may be employed to achieve a tight turning radius for the modular driving apparatus 160, while at the same time providing reliable maneuvering and stability.

The modular driving apparatus 160 further includes a housing 360 generally enclosing the frame, where the housing has a top, a bottom and a plurality of sides. Frame 310 further includes at least one connection mechanism such as a tab(s) 316 extending from the front end or the back end, and through the housing for attachment to and driving of another mechanical apparatus, for example, an operator platform as depicted in FIG. 47 and described below. The small footprint of the modular driving apparatus 160 provides excellent operator egress on both sides of the machine while in a trailer 108.

Figure 32:
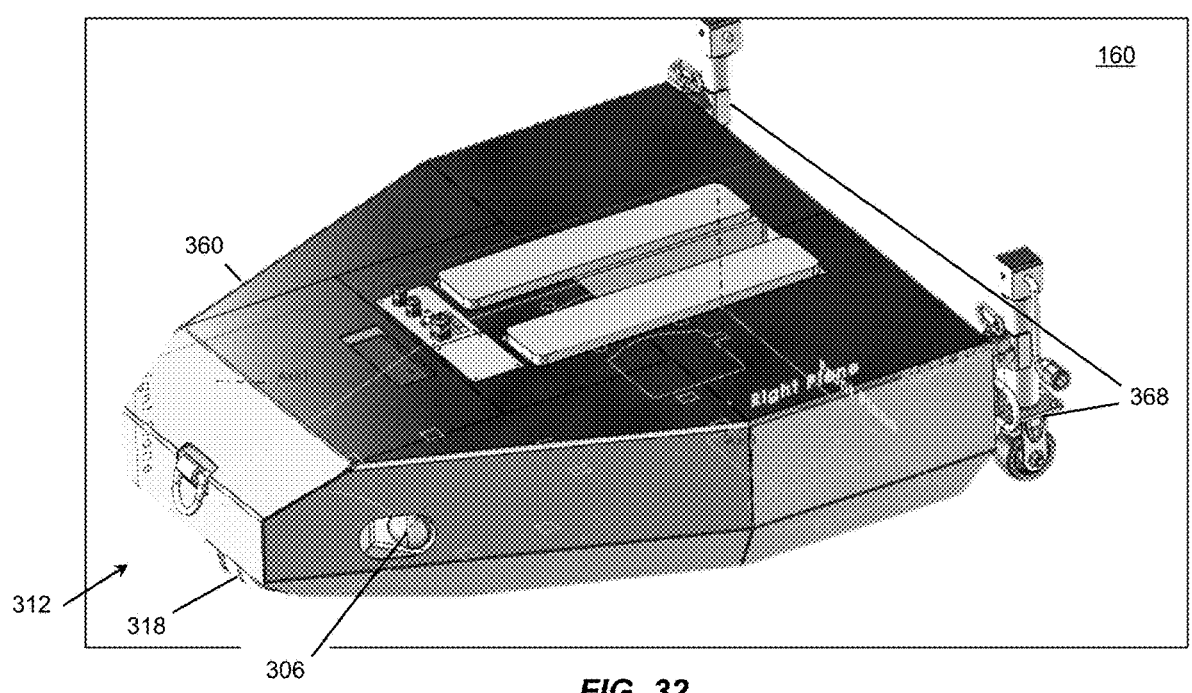

As illustrated in FIGS. 28 and 32, for example, the modular driving apparatus 160 may also include a pair of adjustable leveling casters 368 that are flange mounted to the back of the frame. Such casters may be lowered via a manual crank into contact with the floor beneath in order to lift the drive wheels from floor contact and permit safe removal of an inoperable driving apparatus from a trailer or container.

The modular driving apparatus includes an electrical interface and a controller suitable within control cabinet 308 for receiving an operator's input and controlling the drive wheel motors 330 and 332 in order to provide controlled movement of the modular driving apparatus in response to the input. In some embodiments of the driving apparatus 160, sensors (not shown) may be used for sensing obstacles such as the adjacent interior walls of trailer 108. When equipped with such sensors, the controller may not only prevent collision with obstacles, but may automatically self-center the modular driving apparatus during travel. For example, in a self-centering operation mode, even though responding to an operator's input (e.g., operator requests from handles), the driving apparatus maintains separation from adjacent trailer walls and the like. Electronics, sensors and controls to self-center would be located on the drive apparatus. In addition to the disclosure of operator control of the driving apparatus relative to FIGS. 25 and 26, also contemplated is an operator control panel similar to that depicted in FIG. 70, where the controls are located on or attached to the interface conveyor.

Figures 70, 71:
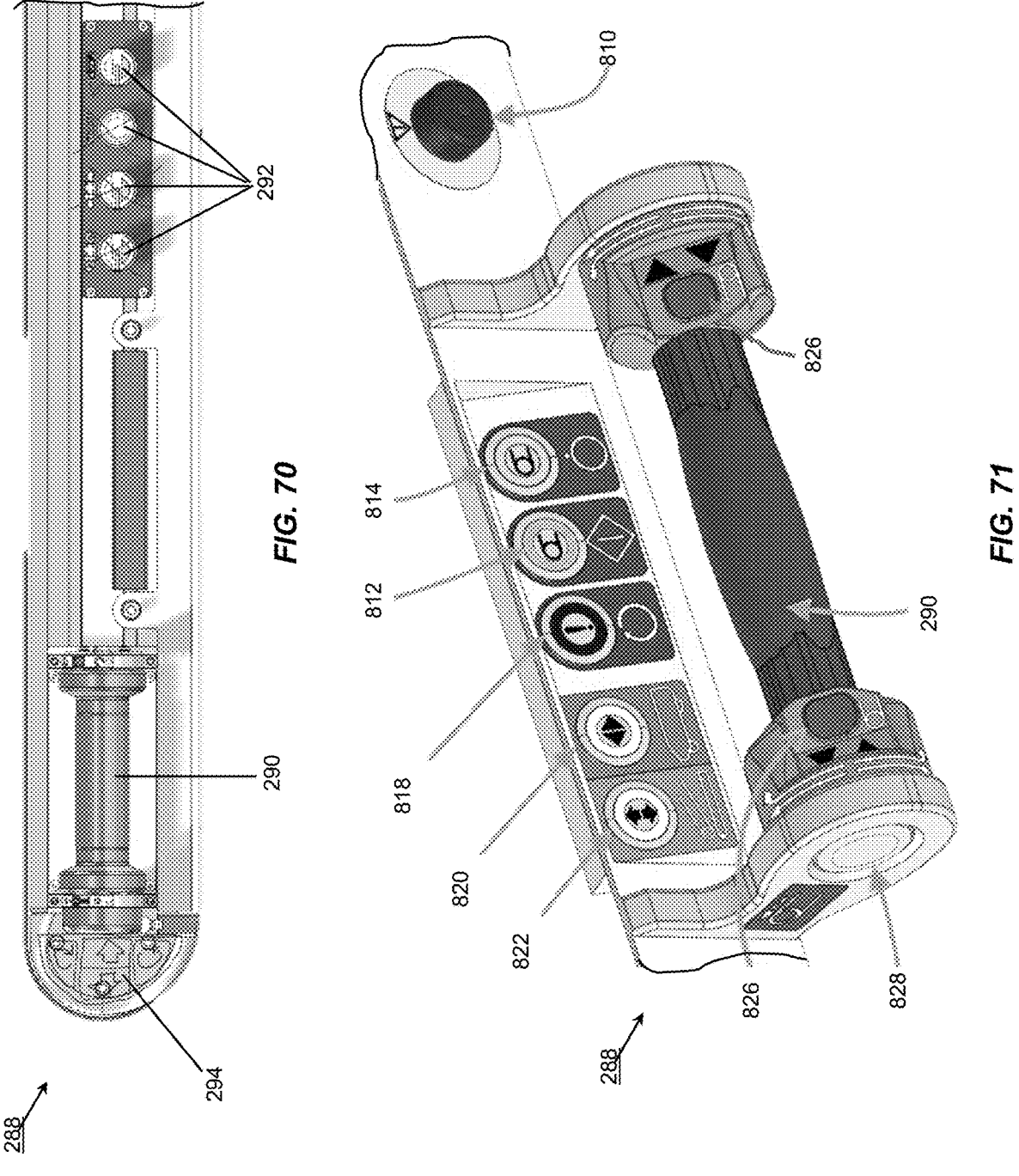
FIGS. 70-71 are illustrations of alternative operator interfaces for control and movement of a conveyor system.

Operator controls 288 such as those illustrated in FIG. 70, for example, are provided using an operating handle design having unique four quadrant operation (e.g., two sides w/FWD and REV walking). All motion of the conveyor interface component 140 and its modular driving apparatus 160 would be requested from handles 290 located on both sides of the pivoting conveyor. In other words, each side of the conveyor would have a rotary-type handle 290, with spring return to center and switch 1—rotate up and switch 2—rotate down. Used for conveyor up/down and travel forward and reverse. Such controls may be located on the pivoting slewing conveyor 260 and may be co-located with conveyor controls as well. Continuing to refer to FIG. 70, an existing button-type interface may be employed (see x-out buttons to right). The buttons 292 are replaced with a touch pad 294, to the left of the rotary handle 290, having at least four independent switches for controlling travel as indicated by the icon on each region of the touchpad (e.g., 4 pads for forward, reverse, clockwise and counter clockwise rotation). Handle 290 further provides an operator-present signal so that the operator controls are only operational so long as an operator grasps the handle.

In an alternative, albeit similar, embodiment of the operator controls 288 illustrated in FIG. 71, the operating handle design once again includes four quadrant operation (e.g., two sides w/FWD and REV walking). All motion of the conveyor interface component 140 and its modular driving apparatus 160 is requested from controls 288 located on the sides of the triple-belt conveyor assembly 250. In other words, each side of the triple-belt conveyor assembly 250 would have the operator controls 288 including a rotary-type handle 290, with spring return to center. The dual sets of controls 288 allows an operator to operate the conveyor interface component 140 and its modular driving apparatus 160 from either side, thereby allowing the conveyor interface component to be positioned close to the wall of a trailer or container on an opposite side. More specifically, controls 288 include an emergency stop button 810 that disables further operation of the conveyor interface component 140. Each if the disclosed buttons may include visual and/or audible indicators to signal to the operator when the button has been activated. Buttons 812 and 814, respectively start and stop the conveyors, including the conveyors of the of the conveyor interface component 140, and the extendible conveyor 124, if electrically connected. Button 818 is a fault reset button used to clear any faults that are detected, including clearing sensor faults (e.g., upon sensing obstructions near or in path of the conveyor interface component 140, the sensor may disable further movement until the fault is reset). Button 820 is used to enable or place the conveyor interface component 140, and particularly its modular driving apparatus 160, into a travel mode where subsequent activation of the handle 290 results in movement of the modular driving apparatus 160. And button 822 is used to activate up/down mode, wherein the handle controls the position (vertical angle) of the triple conveyor assembly 250, in order to adjust it to an appropriate position for operators to pick or place objects thereon. In travel mode, handle 290 may be grasped and rotated clockwise or counter-clockwise and slid side-to-side (left-right) to steer the modular driving apparatus 160 during travel. Similarly, buttons 826 on either end of the handle 290 may be used to manually cause the modular driving apparatus 160 to travel forward and reverse when the apparatus is in travel mode. When the up/down button 822 has been depressed, the up/down functionality of handle 290 is enabled, wherein the leftmost button 826 raises the triple conveyor assembly 250, and the rightmost button 826 lowers the triple conveyor assembly. Lastly, button 828 is a conveyor jog button that operates the conveyor only while the button is pressed.

The controls 288 may be located on the sides of the multi belt conveyor assembly 250 or in other locations as the design and operation of the system may dictate. For example, it may be possible to include one or more control functions in a position that is easily reached from an operator platform, for example, to adjust the position of the multi-belt conveyor assembly 250. Alternative button-type interfaces may be employed with or without a joystick or similar directional control for the travel feature. Handle 290 further provides an operator-present signal so that the operator controls are only operational so long as an operator grasps the handle.

Also considering FIGS. 34-52, depicted are various components and views of embodiments for a conveying system having a movable operator platform 410 featuring adjustable width and/or height, which is combined with an extendible conveyor 124 and an adjustable conveying apparatus 140, 160 to provide a complete conveying solution suitable for loading and unloading trucks, trailers and containers. FIGS. 46-52 show particular embodiments of the movable conveying system 120 for loading and unloading objects in conjunction with an extendible conveyor. In general, each of the conveying systems include a driving apparatus 160 removably connectable to the extendible conveyor 124, and an adjustable conveying apparatus 140 including at least one pivoting conveyor 260 operatively affixed on the driving apparatus, where the adjustable conveying apparatus is suitable to exchange objects (e.g., packages) with the extendible conveyor on a first end and with an operator on an opposite second end. Each conveyor system 120 further includes a movable operator platform 410 removably connected to the driving apparatus and positioned beneath the second end of the pivoting slewing conveyor 260.

In the illustrated conveying system, adjustable operator platform 410 includes a telescoping base 420 including a first generally C-shaped frame member 422 and a second generally T-shaped frame member 424. As a comparison of FIGS. 34-37 illustrates the second frame member (stem of the T) slides horizontally within the first frame member as illustrated by arrow 426 such that a footprint of the periphery of the base is expanded or contracted by sliding the second base frame member 424 relative the first base frame member 422. A plurality of caster wheels 430 are attached to the bottom of each of the first and second frame members 422 and 424, so that no matter the configuration (expanded or contracted) there are casters supporting the frame sections. Above the telescoping base is a similarly telescoping operator surface 440 including an outer frame member 444 and an inner frame member 448. The surface's inner frame member 444 slides horizontally within the outer frame member 448 of the operator surface such that a footprint of the operator surface is also expanded or contracted by sliding the inner frame member relative the outer frame member.

The operator platform also includes an adjustable elevation system operatively connecting the telescoping base to the operator support surface 440 to enable the height of the operator support surface to be controlled relative to the telescoping base 420. The movable operator platform 410 also includes at least two elevator mechanisms, where a first elevator mechanism 450 is operatively connected between the first cross support 452 (e.g., a generally C-shaped frame member) of the base 420 and the outer frame member 444 of the operator support surface and a second elevator mechanism 470 is operatively connected between the second generally T-shaped frame member 424 of the base and the inner frame member 448 of the operator support surface. And, a first electromechanical actuator 456 is operatively connected to the first elevator mechanism 450 for controlling the first elevator mechanism and a second electromechanical actuator 476 is operatively connected to the second elevator mechanism 470 for controlling the second elevator mechanism, wherein the first and second electromechanical actuators are electronically synchronized to synchronously raise and lower the inner and outer frame members of the telescoping operator support surface relative to the first and second base frame members of the telescoping base. Power for the electromechanical actuators 456 and 476 may be provided from an on-board rechargeable power supply, or possibly from the power supply of driving apparatus 160. Power may also be provided via a wired connection such as electrical conductors provided via the extendible conveyor 124.

In one embodiment, each of the elevator mechanisms 450 and 470 include at least one elevating linkage 462 such as a scissor assembly positioned between the telescoping base and the telescoping operator support surface, the elevating linkage 462 including a first pair of parallel members pivotally attached mid-length to a second pair of parallel members, wherein one end of the first pair of members is pivotally attached to the upper cross support (e.g., a C-channel or similar member) and one end of the second pair of members is pivotally attached to the lower cross support, and where an opposite end of the first pair of members is operatively attached to a linear actuator 456 or 476 such that activation of the linear actuator results in a change in height of the top of the elevated linkage scissor assembly 462, thereby raising and lowering the operator support surface.

As seen for example in FIG. 47, the movable operator platform may be operatively connected to the driving apparatus 160. As illustrated the first frame member 422 of the telescoping base 420 includes rigid members 428 extending therefrom for removable connection to at least one connection mechanism of the driving apparatus. The movable operator platform 410 also includes a first operator handrail 460 attached to and extending upward from the outer operator support platform and a second operator handrail 464 attached to and extending upward from the inner operator support platform. The handrails are designed to provide operator protection, but to avoid interfering with the exchange of objects on the adjacent conveyor (e.g., a slewing conveyor section 260).

As discussed above, relative to FIGS. 7 and 8, the adjustable conveying apparatus of the movable conveying system 200 may include a support frame or pedestal 220 operatively attached on the driving apparatus 160, along with a tiltable transition conveyor section 210 pivotally coupled to the frame. The conveyor section 210 is capable of pivotal movement about a first generally horizontal axis 226. And, on opposing end 204, conveyor section 210 is suitable for exchanging objects with the extendible conveyor 124. Conveyor section 210 may include a driven surface such as a belt 212, or it may include driven or passive rollers 214. Conveying apparatus 200 also includes a pivot frame member 222 pivotally coupled to the support frame or pedestal 220 for pivotal movement about a generally vertical axis 224. Pivotally attached to the pivot frame member 222 is a slewing conveyor section 260 having a first end 264 pivotally coupled to the pivot frame member 222 for pivotal movement about a second generally horizontal axis 228, and an opposing second end 268 shaped for exchanging objects with an operator (not shown). As illustrated, the first generally horizontal axis 226 and the second generally horizontal axis 228 are maintained by the support frame or pedestal 220 and the pivot frame 222, respectively, at the same vertical height, so that an object on the upper surface of the respective conveying components may transition from one to the other.

In one embodiment of the movable conveying system 120, the driving apparatus 160 includes a pair of drive wheels and turns turn through a 180-degree range, and the transition assembly is also centered about the vertical driving axis so as to adapt between the extendible conveyor 124 and the operator platform 410. It will be appreciated that the driving apparatus 160 may be fitted with lights 306 for use in trailers, and also with sensors suitable for detection of obstacles and the sides of the interior of the trailer for self-centered driving as described above.

Also contemplated is the separate use of the operator platform 410, either as a stand-alone apparatus, or operatively connected to an alternative conveyor configuration. Such a platform would continue to be operational in the manner described so that it could extend horizontally to almost the width of a trailer when in use, and contract to the smaller footprint for ease of movement. Moreover, the operator platform 410 can be adjusted while in use to place the operator(s) at an appropriate height for loading and unloading objects from the trailer 108.

An alternative embodiment of platform 410 is depicted in FIGS. 40-44, where the lifting mechanism for the movable platform employs a pair of linear actuators 478 in combination with inverted chainfalls 480 on either side of the platform, with the chains anchored on one end to the movable platform 440 and on the other end to the base 420, passing over sprocket 482. Base 420 includes wheels or casters 430 to permit easy movement, perhaps with an attached modular driving apparatus 160. When operatively and electrically connected to the modular driving apparatus

160, power to raise/lower the platform 440 via actuators 478, and motive force to drive the platform 410, is provided via the driving apparatus itself.

Figures 40, 41:
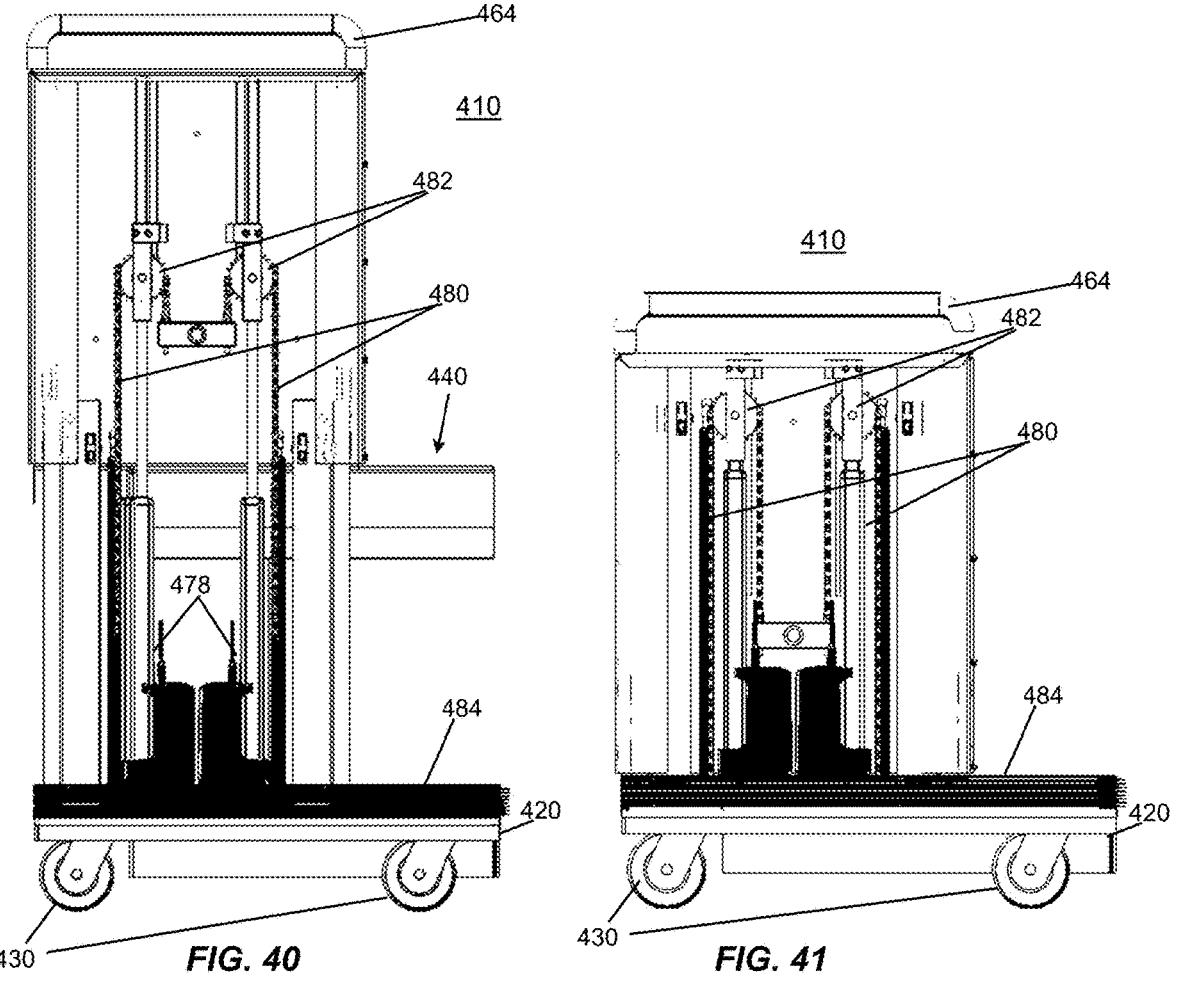
FIGS. 40-44 are views of an alternative movable operator platform.
Figure 42:
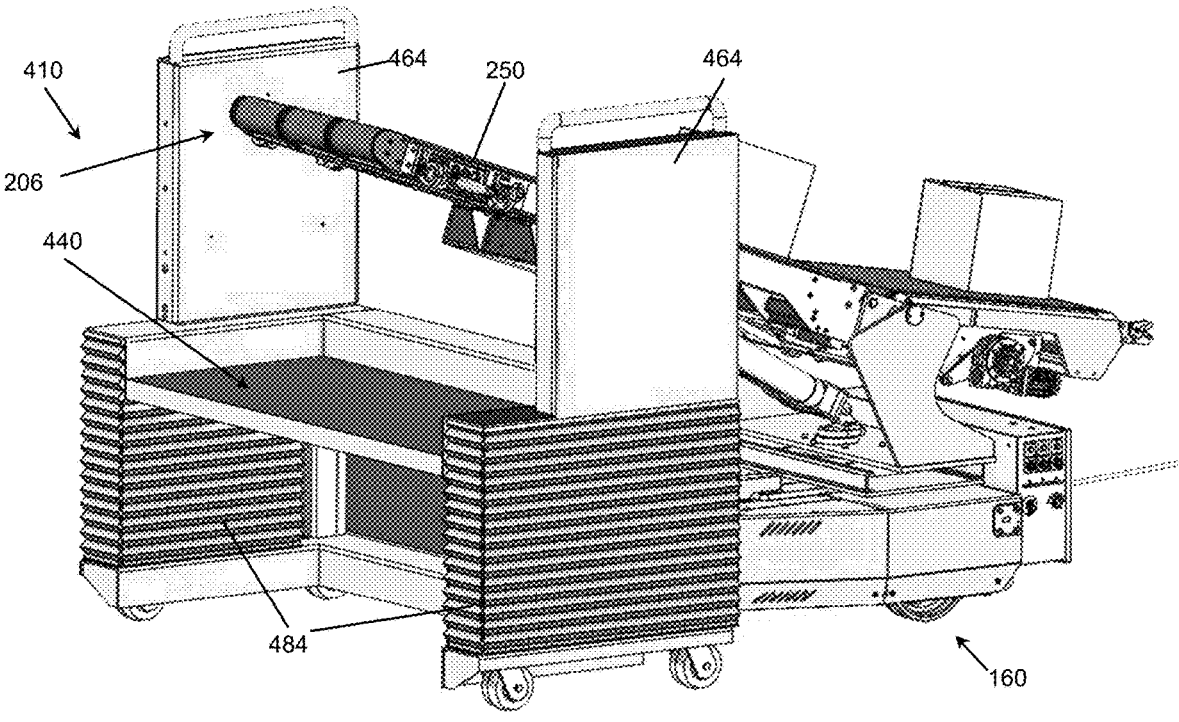
Figure 43:
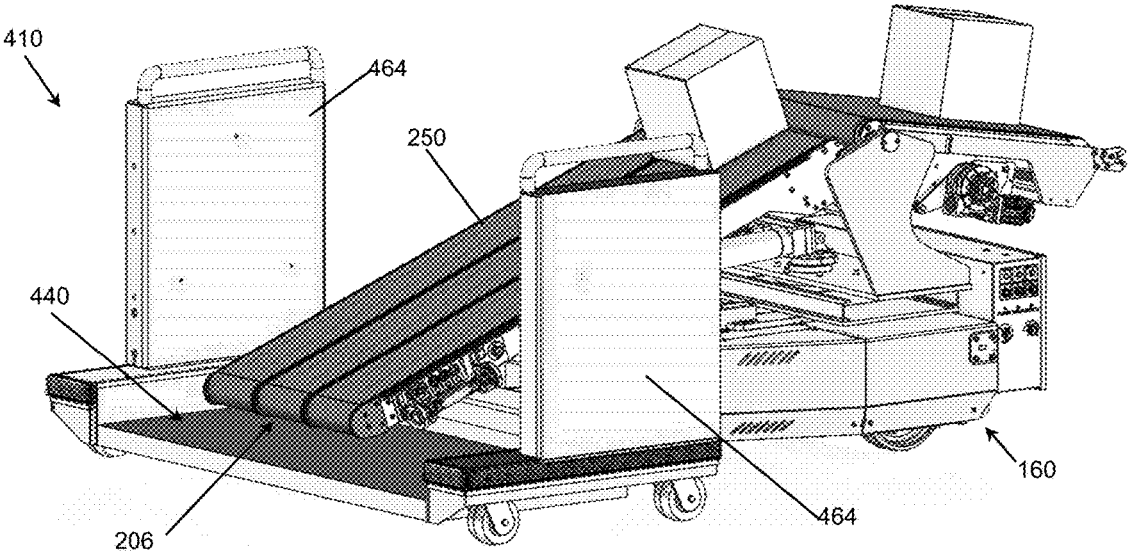
Figure 44:
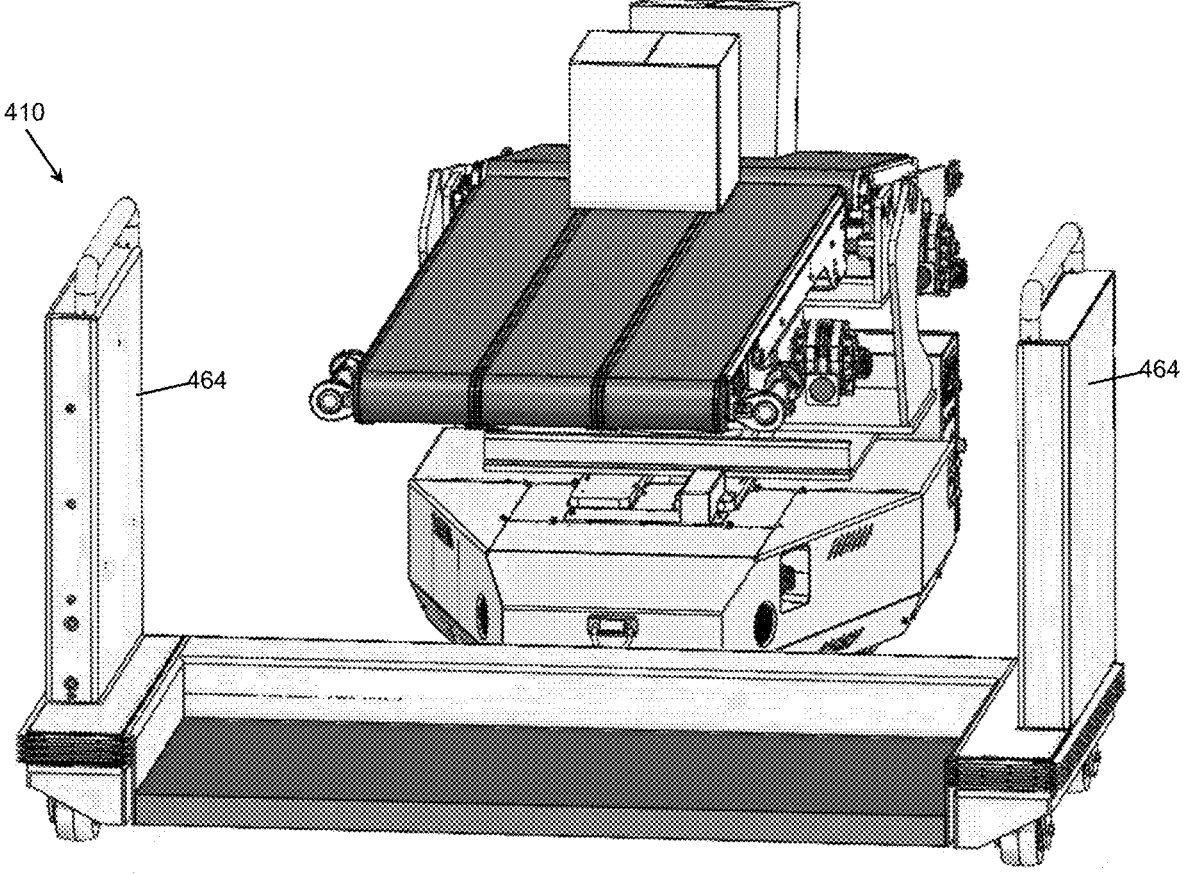

Use of the linear actuator and chain system to raise/lower platform 440 provides a lower-cost alternative to scissor-like mechanical-lift configurations. Referring to FIGS. 40-4, the lift platform 410 employs a total of four linear actuators 478 on the platform (2 per side), where the actuators include built in motors. In one embodiment, the actuators are Model LA36 made by Linak and feature mechanical self-locking devices that include steel gearing, a brake between the actuator and the motor, as well as redundant magnetic braking by shorting the motor winding. Further included are the requisite gearing, clutch, integrated controller, controller area network (CAN) communications, tandem control as standard, end of travel limit signals, and position feedback with integrated hall-effect sensor pulses.

The disclosed actuator and chain lift mechanisms provide redundant design that is considered safe with people elevated on the platform. The combination of four actuators 478 with redundant mechanical/magnetic self-locking features contributes to the level of safety, where a failure of any one actuator does not risk dropping the platform. As illustrated in FIGS. 0-44, platform 410 provides up to 26 inches of vertical travel for the operator surface 440 using the gear and chain to double the stroke of the actuator 478. Also contemplated is the use of counterbalancing mechanisms (e.g., a gas shock on each side or torsion spring counterbalance) on either side of platform 410. Failure of the counterbalance mechanism can be detected by current monitoring, although failure of the counterbalance does not risk rapid decent of the platform.

In the illustrated design of FIGS. 40-44, the platform 410 in is not cantilevered. This allows for significant reduced weight savings in the balance of components used in the platform. To the extent that a larger operator surface is desired, the depicted design may include a manually extendible slide or similar feature that provides additional horizontal surface area, so that the operator manually extends and retracts the operator surface 440. In one embodiment a 48V battery system is used to power the platform 410, including servo-motors on the base, eliminating the need for additional power supplies and electrical panel space. Moreover, the actuator motor controls and sensors are designed for controlling multiple actuators in parallel based upon a master actuator, further saving on component costs and design of controls. The master actuator monitors and knows if an actuator gets out of sync or overloads, and stops the travel putting the platform in into safe mode in the event that such a fault is detected. As will be further appreciated the disclosed actuator-chainfall lifting mechanism is similar suitable for both fixed-width and adjustable-width platforms. For safety purposes a simple bellows 484 is employed to cover the exposed actuators and sliding guides during lifting and lowering the operator platform to avoid pinch hazard concerns. The actuator-chainfall mechanisms are housed within the guardrail space is being used to house the actuators and other mechanics doing the lifting. The side plate is removed for very easy access to all components. See through plates provide inspection of critical load bearing points. And the guardrails may further include lighting, controls, etc. As illustrated, the platform 410 would be supported on 6" diameter dual wheel casters 430, which provides the ability to roll over dock plates, reefer slotted floors and reduces the required push force by operators extending/retracting the platform. The platform has a pivoting link bracket connecting to the modular driving apparatus 160 to allow for required compliance driving over uneven/inclined surfaces.

Figure 49:
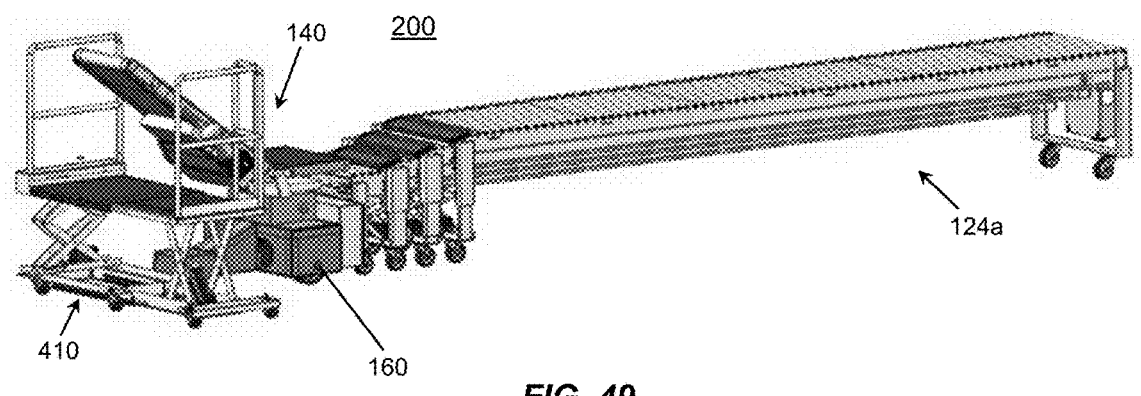
Figure 50:
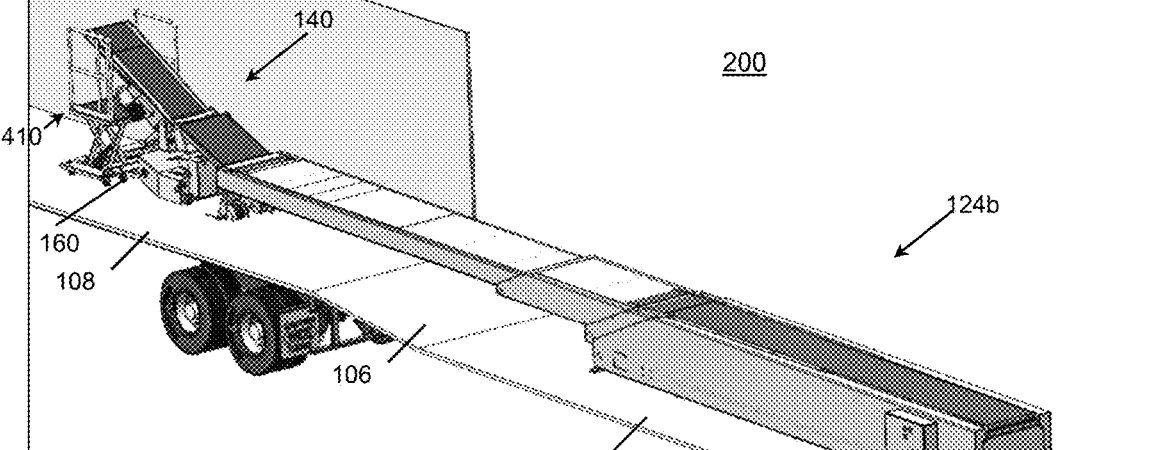
FIGS. 50-52 are view of a similar conveyor system with alternative conveyor types.
Figure 51:
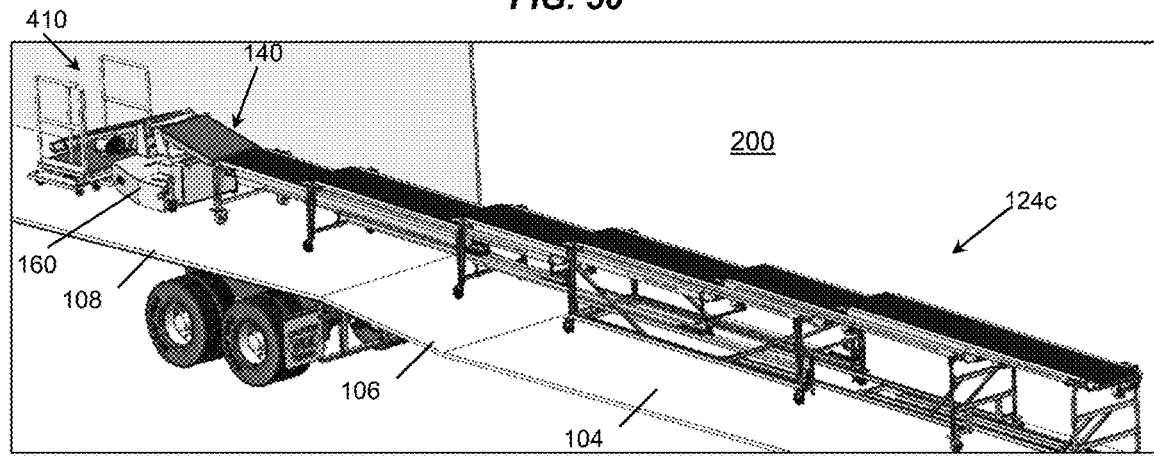
Figure 52:
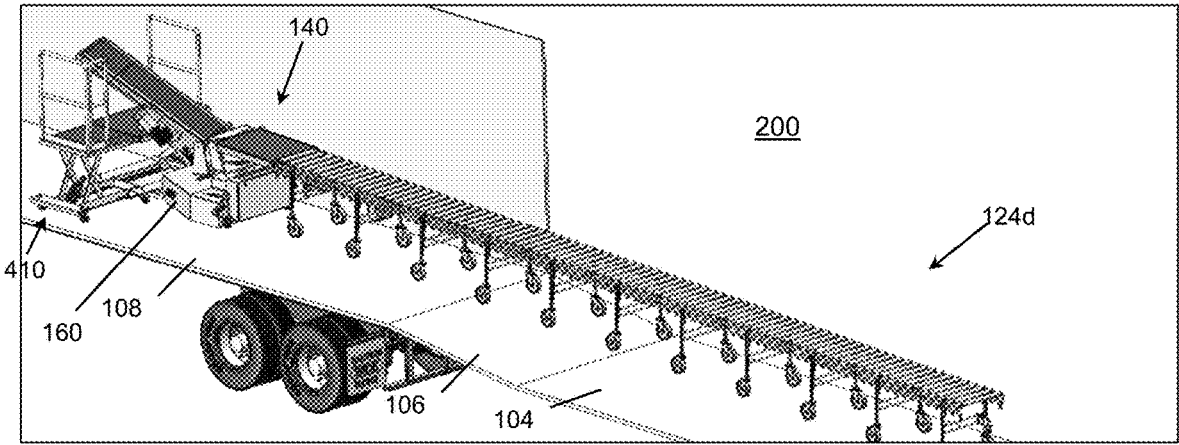
Figures 53, 54:
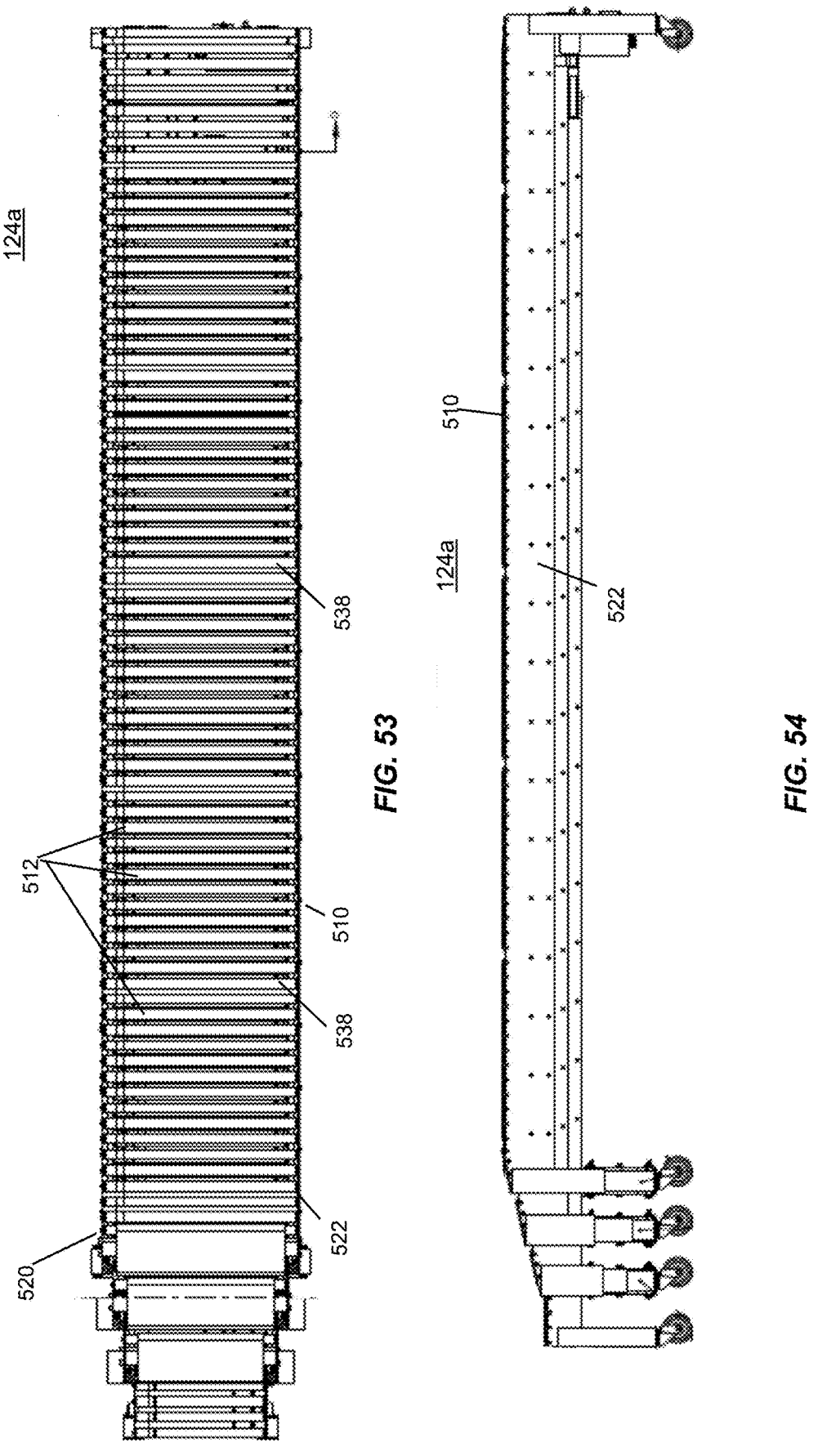
FIGS. 53-69 are illustrative drawings of an extendible conveyor in accordance with a disclosed embodiment.

Next, FIG. 49 illustrates a complete conveying system 120 as described in detail herein with a telescoping extendible conveyor 124a, a driving apparatus 160 with an adjustable conveying apparatus 140 thereon, along with an operator platform 410. Similarly, FIGS. 50-52 depict the conveying system 120 in three alternative configurations, each including a different extendible conveyor type (124b, 124c, 124d), but all including a driving apparatus 160 with an adjustable conveying apparatus 140 thereon, along with an operator platform 410.

Characteristics of the conveying system 120, and particularly the driving apparatus and associated conveyor interface 140 may include: a pivoting conveyor operating range, floor level to 15-degrees above horizontal; a 400 lb. tow capacity and 35 feet/min. travel speeds; a 150 lb. belt capacity on 30-degree incline for the slewing conveyor section 260; operator controls on both sides including operator present detection, and joy stick thumb control for travel and steering as described relative to FIG. 70; emergency stop buttons; ground fault protection and ground conductor monitoring; a grip top belt on the slewing conveyor section 260; a variable frequency drive (VFD) drive controlling the AC motor for conveyor section 260 with adjustable speed control; includes work zone lighting; an audible warning device that warns of impending motion, and audible warnings could also vary in in intensity, beep pattern, etc. based on proximity to the machine; the system is designed with provisions for lifting and transport by fork lift; and optional travel sensors on the sides and rear. As noted elsewhere, the driving apparatus, conveyor interface 140 and/or an operator platform 410 may further include non-contact ultrasonic sensing devices to detect objects in the path of any of the conveyor component(s). The sensor(s) would mount to the front of the pivoting conveyor, for example. The same technology would be employed to detect objects around the platform with an array of sensors so that obstructions such as people, packages and trailer walls would be detected, and collisions avoided.

Figure 45:
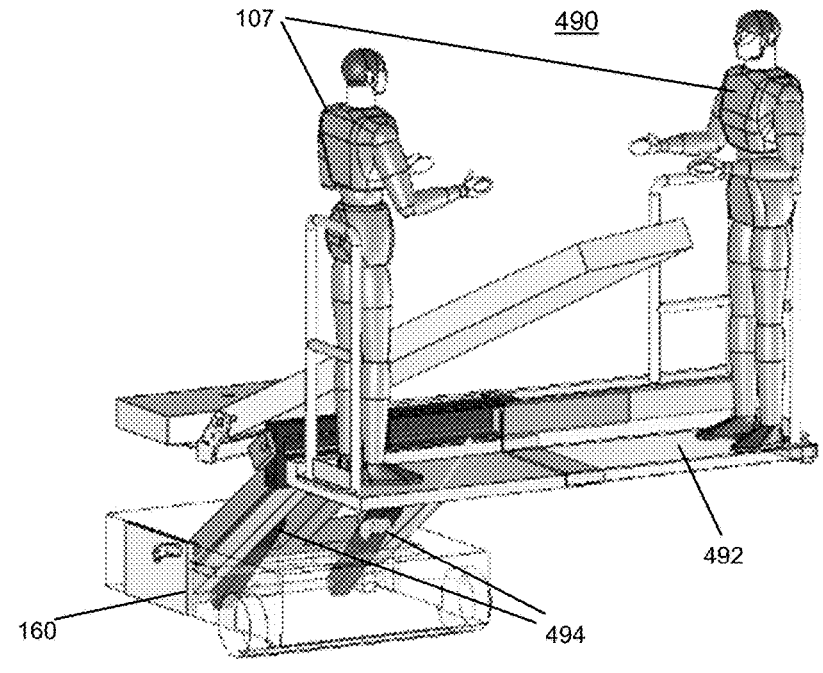
FIG. 45 is a perspective concept view of an alternative embodiment for a movable operator platform.
Figure 46:
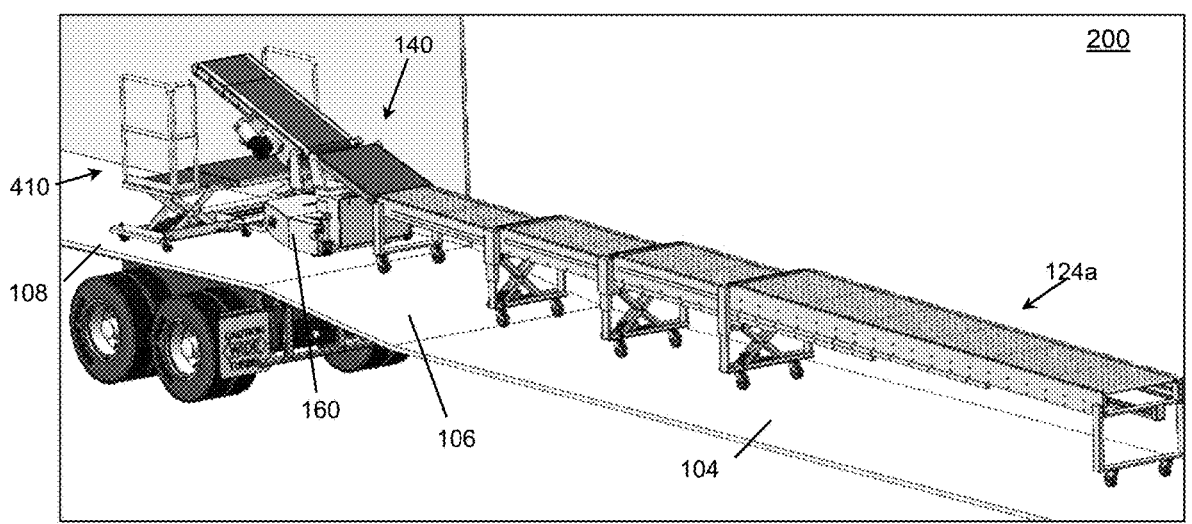
FIGS. 46-49 are illustrative views of a conveyor system including a telescoping conveyor in combination with a conveyor interface component and movable operator platform.

FIG. 45 is a perspective view of an alternative embodiment for a movable operator platform 490, where the platform is based on and operatively connected to the driving apparatus 160. In the embodiment of FIG. 45, the operator support surface 492 is also adjustable in height and is supported by cantilevered linkages 494 from the driving apparatus, which would require adequate ballast in the driving apparatus to assure balance is maintained.

Turning next to FIGS. 53-69, illustrated therein are detailed representations of a telescoping extendible conveyor 124a in accordance with an embodiment of the disclosed conveying system 120. It should, however, be understood that while described in conjunction with other components, the conveyor 124a may be a stand-alone system suitable for extensible use. More specifically, conveyor 124a is a bi-directional conveyor, including a plurality of telescoping conveyor sections. The outermost conveyor section 510 has a first width (e.g., 42 in.) and includes a pair of opposed side members 520 and 522, and at least two pairs of auto-leveling leg assemblies 528 attached to and supporting the opposed side members at or adjacent to each end. At least one pair of guide rollers 530 and a pair of opposed guide channels 534 are mounted on an interior of each opposed side member 520 and 522. And the conveying surface for section 510 includes a plurality of cylindrical conveyor rollers 512 spanning between the opposed side members, where at least one of the cylindrical conveyor rollers is a motorized roller 538—motorized meaning it is a driven roller from an internal motor or a motor compliantly connected to (e.g., via elastomeric band) or contacting the roller. It will be appreciated that alternative motor(s) configurations may be used with one or more of the extendible conveyor sections to power one or more of the rollers as required. Moreover, the motorized roller is controllable as to direction, speed and the like, and is used to drive one or more adjacent rollers so that the entire conveying surface is capable of moving objects thereon, for example, using a continuous elastomeric member to operatively connect adjacent rollers. Section 510 also includes a power ramp 540 at a first end of the outermost conveyor section to facilitate transfer of an object (e.g., package) between the outermost conveyor section 510 and the adjacent nested conveyor section 550a. As another alternative, a full-length belt may be employed instead of rollers on one or more conveyor sections. The modular design of the frames will allow for this.

Conveyor 124a further includes a plurality of extendible conveyor sections 550a and 550b nested within the outermost conveyor section 510, each of the extendible conveyor sections has a progressively smaller width, for example 33 in. and 29 in, respectively, although any widths may be possible so long as they are progressively smaller. Each extendible sections 550a and 550b each include a pair of opposed side members, 560a,b and 562a,b, at least one pair of auto-leveling legs 558a,b attached to and supporting the opposed side members 560a,b and 562a,b, and at least one pair of guide rollers 530 and a pair of opposed guide channels 534 mounted on an interior of each opposed side member of the extendible conveyor section and a guide rail 536 mounted on an exterior of each opposed side member of the extendible conveyor section, where the guide rail 536 passes through the rollers and guide rails of an adjacent conveyor section (e.g., section 510 rollers 530 and a pair of opposed guide channels 534) to facilitate telescoping of the extendible sections 550a and 550b relative to a outwardly adjacent conveyor section (510 or 550a).

As with the outermost section, each of the sections 550a and 550b similarly include a plurality of cylindrical conveyor rollers 512 spanning between the respective opposed side members 560a,b and 562a,b of the extendible conveyor sections, at least one of the cylindrical conveyor rollers is a motorized roller 538 able to provide a driving rotational force to one or more adjacent, non-motorized rollers as described above. To facilitate the use of the elastomeric bands, each conveyor roller (e.g., 512) includes a pair of annular grooves to facilitate the retention and tracking of the continuous elastomeric members 532 operatively connecting adjacent rollers.

Also included is a power ramp 570a,b at a first end of each extendible conveyor section to facilitate transfer of an object (e.g., package) between adjacent sections.

The extendible conveyor 124a further includes an innermost conveyor section 580 nested within one of the extendible conveyor sections (e.g., 550b), and itself includes a pair of opposed side members 582 and 584, at least one pair of legs 588, which may be fixed height or possibly auto-leveling, are attached to and supporting the opposed side members 582 and 584, and a guide rail 536 is mounted on an exterior of each opposed side member 582 and 584, where the guide rail passes through the rollers 530 and guide channels 534 of an adjacent one of the extendible conveyor sections (e.g., 550b) to facilitate a telescoping of the innermost section 580 relative to the adjacent conveyor section (e.g., 550b). Again, section 580 includes a plurality of cylindrical conveyor rollers 512 spanning between the opposed side members 582 and 584 wherein at least one of the cylindrical conveyor rollers is a motorized roller 532 and is similarly controllable and able to provide a driving rotational force to one or more adjacent, non-motorized rollers.

Figures 58, 59, 60, 61, 62, 63:
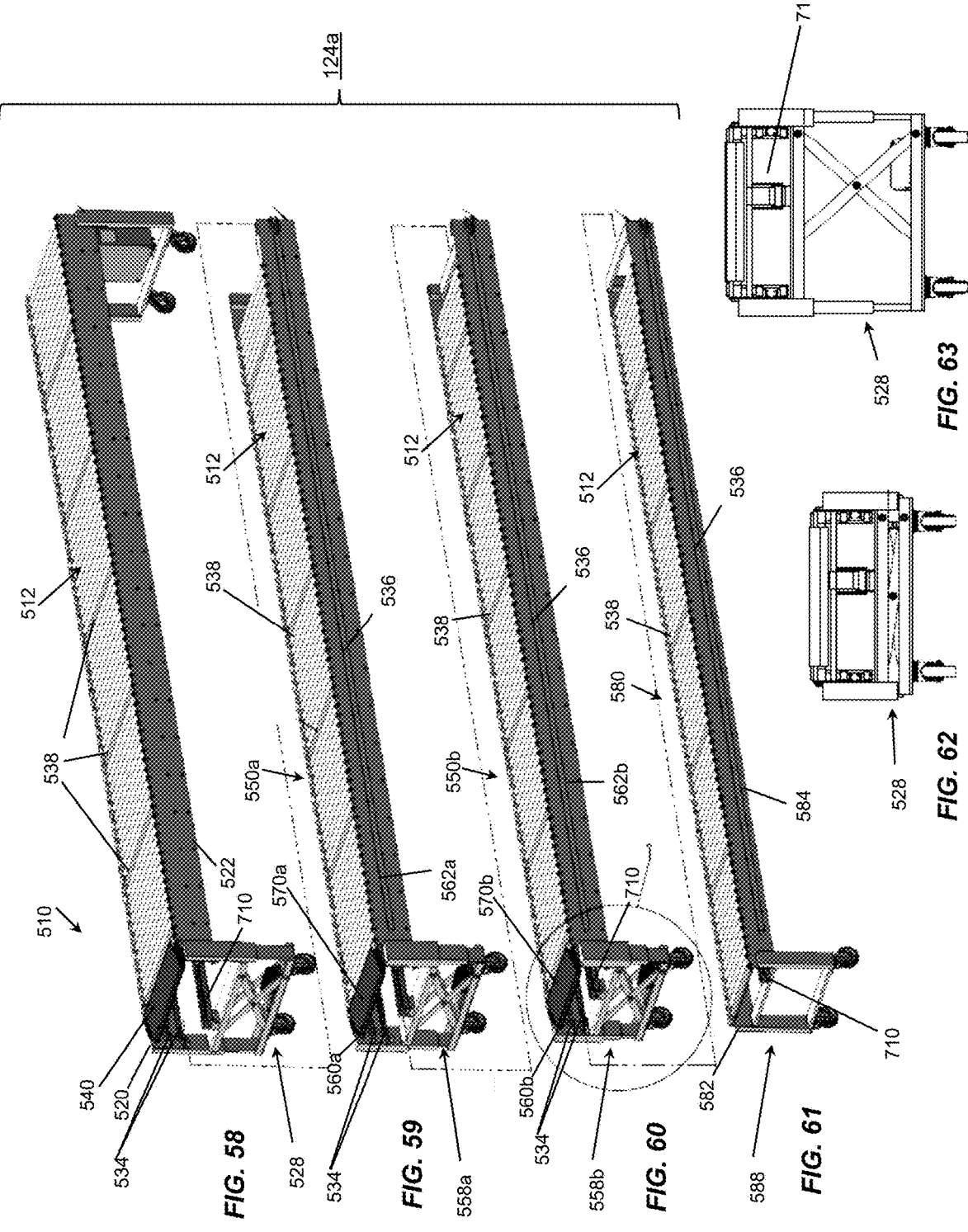
Figure 64:
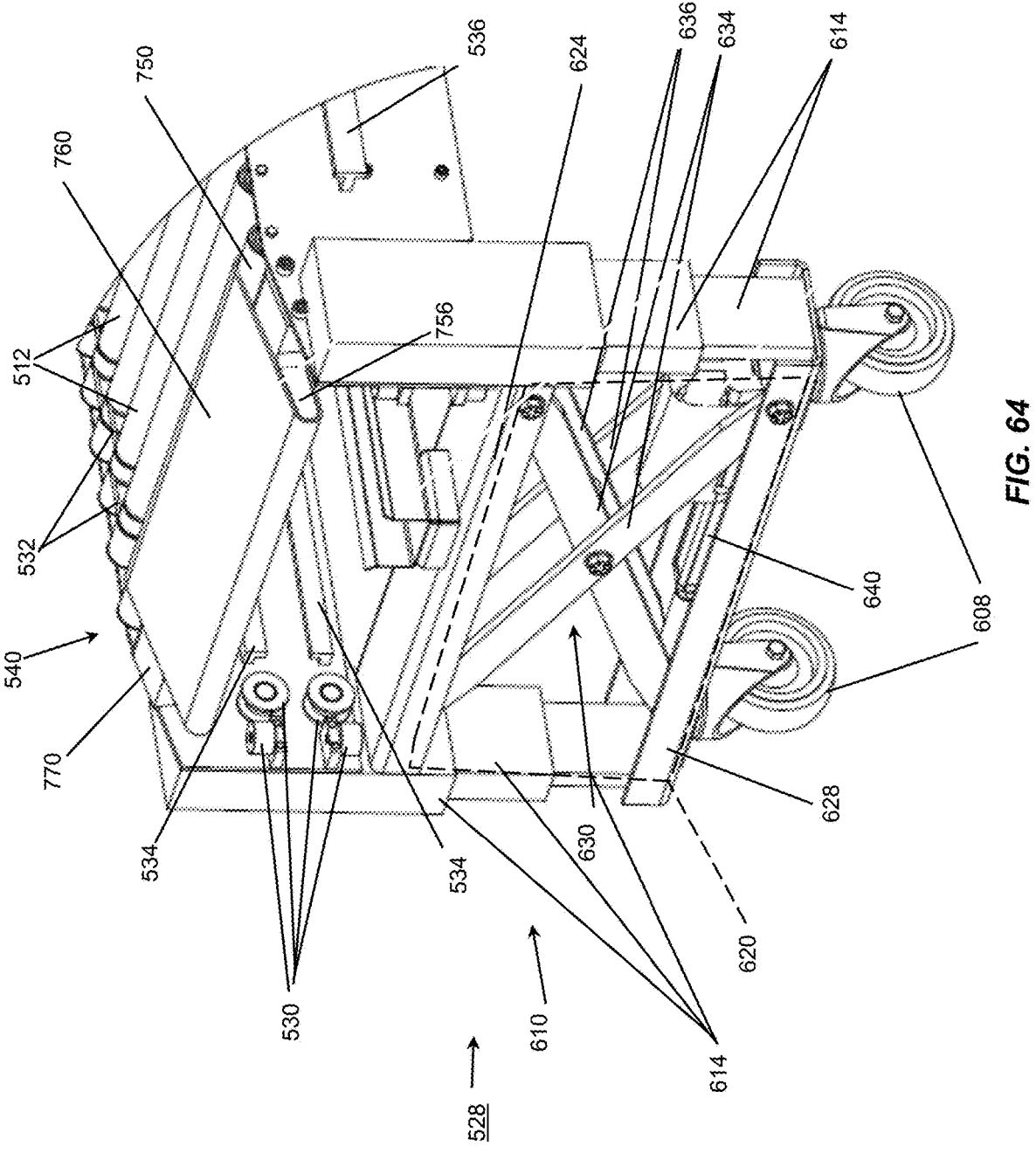
Figure 66:
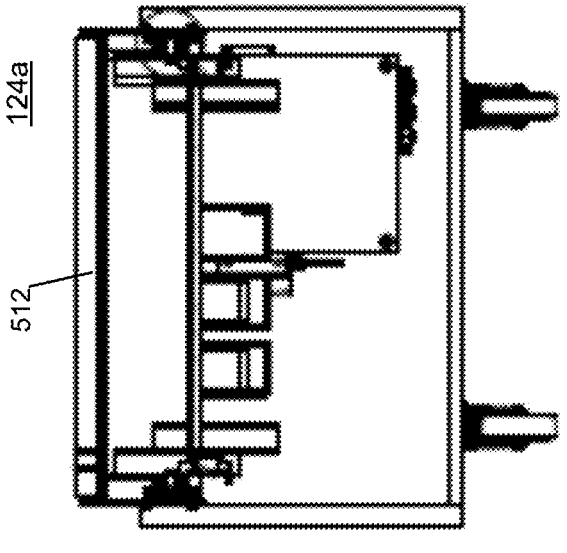
Figure 65:
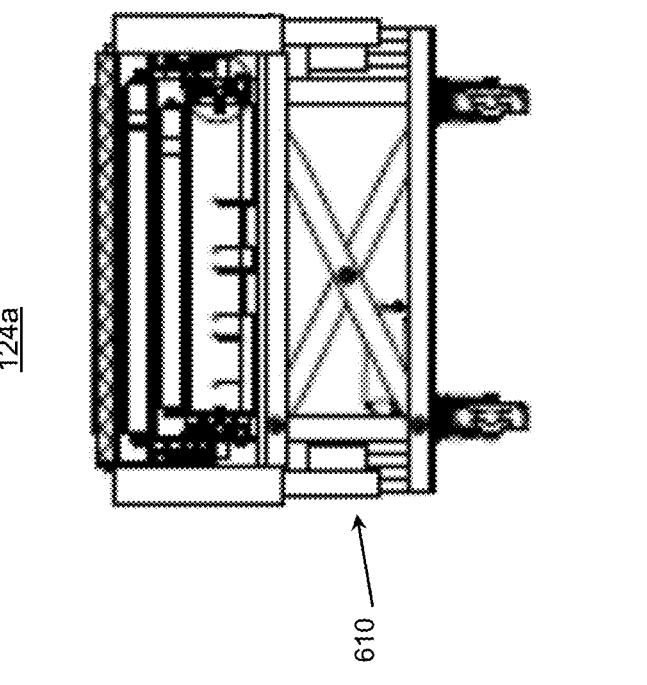
Figures 67, 68:
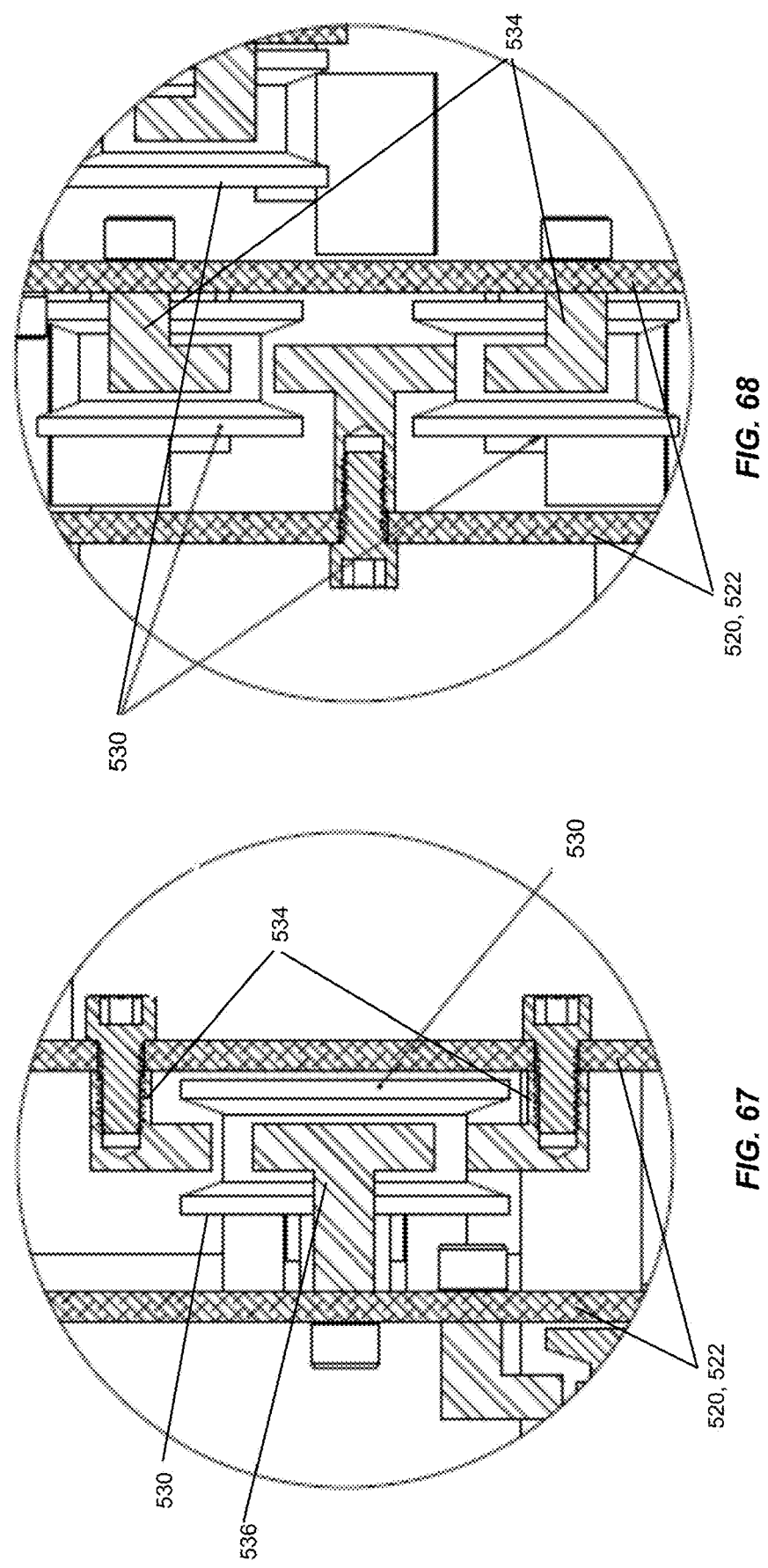
Figure 69:
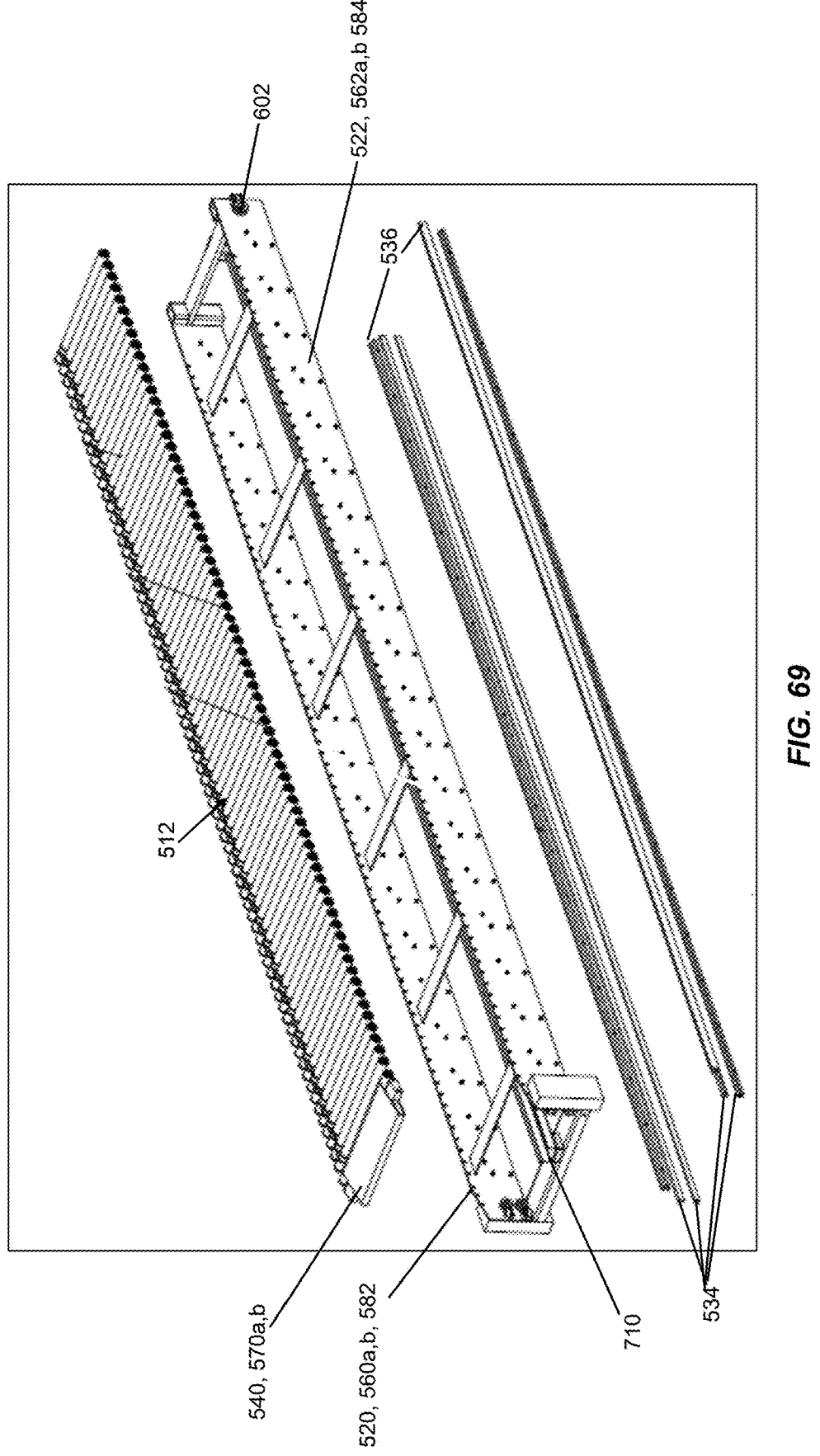

In the bi-directional conveyor 124a, each of the pairs of auto-leveling leg assemblies (e.g., 528, 558a,b) includes a pair of telescoping legs 610 including a plurality of telescoping sections 614, each telescoping leg extending downward from a respective one of the side members. In the embodiment depicted, the three sets of legs in the middle are adjustable while the legs at the ends are fixed height, and this would be the case regardless of the number sections in the telescoping conveyor embodiment of 124a. Each of the auto-leveling legs has a height-adjusting mechanism 620 to control the length of the telescoping legs 610, and a caster wheel 608 attached beneath each of the telescoping legs 610. In one embodiment, the auto-leveling leg assemblies (528, 558a,b) further include (i) an upper cross support 624 spanning between the respective opposed telescoping sections 614, the cross support having a flat surface or an open side of a C-channel facing downward, (ii) a lower cross support 628 spanning between a lowermost telescoping leg section 614 of the respective legs and the cross support having an open side or interior of C-channel facing upward, and (iii) an elevated linkage assembly 630 (e.g., one or more X-shaped scissor linkages) X positioned between the upper cross support and the lower cross support, the linkage assembly including a first pair of parallel members 634 pivotally attached mid-length to a second pair of parallel members 636, wherein one end of the first pair of members is pivotally attached to the upper cross support 624 and one end of the second pair of members is pivotally attached to the lower cross support 628, and where an opposite end of the first pair of members is operatively attached to a linear actuator 640 such that activation of the linear actuator results in a change in height of the elevated linkage assembly, thereby retracting and extending (telescoping) legs 610. FIGS. 62 and 63 show the relative height adjustment achievable with the auto-adjusting leg assemblies, and it will be appreciated that modified or alternative mechanisms may be employed to accomplish equivalent or greater adjustments in height. For example, an alternative embodiment for extending and retracting the telescoping legs 610 may employ a rotary motor with chainfall and sprockets (see e.g., disclosure relative to an embodiment of the operator platform height adjustment). Or, manually adjusted leg sets could be employed as well.

To facilitate automated operation of bi-directional conveyor 124a, each set of auto-leveling leg assemblies (528, 558a,b) includes at least one sensor (not shown) associated with it to sense when the legs or casters 608 are no longer in contact with a surface below and when the top of the conveyor section to which the legs are attached exceeds a predefined angle relative to an adjacent section. Such a sensor could include force sensors operatively connected to the telescoping legs to sense when they are in contact with the floor or trailer bed. The adjustment of the height of each pair of auto-leveling leg assemblies (528, 558a,b) is accomplished as a function of the input from at least one sensor or more appropriately as a function of input from a plurality of sensors associated with multiple pairs of auto-leveling legs along with a control process so that the height adjustment of one set of legs does not adversely impact another section of the conveyor. An objective of the leg-height adjustment controls is to ensure all conveyor section surfaces are parallel to one another, even though all may be tilted overall in an upward or downward direction depending upon the relative vertical position of the truck, trailer or container. In one embodiment the first and last legs of extendible conveyor 124 are fixed height, and thus the intermediate legs adjust based on two possible sensing methods: (i) using signals from multiple tilt sensors or inclinometers, the control loop adjusts legs to drive/maintain the same level value from each sensor; or (ii) a vertical gap between conveyor sections may be measured with an optical sensor, and the specific gap value would be the setpoint for closed loop control.

For example, the fixed leg assembly 588 of the lowest adjustable conveyor section 580 is "master" when travelling in the forward direction into the trailer. Next leg assembly 558b of section 550b follows section 580 down or up. The controller monitors the sensor detecting an angle between section 580 and section 550b, and adjusts the leg extension or retraction of leg assembly 558b to match the angle of section 580. The process repeats for all remaining conveyor sections (e.g., 550a and 510) and their associated leg assemblies (e.g., 558a and 528). The controller monitors the sensor detecting an angle between section 550b and section 550a, and adjusts the leg extension or retraction of leg assembly 558a to match the angle of section 550b. The controller monitors the sensor detecting an angle between section 550a and section 510, and adjusts the leg extension or retraction of leg assembly 528 to match the angle of section 550a. The closed loop control is tuned for optimal performance with travel speeds and rate of elevation change specifications. The control algorithm dynamically maintains the parallel relationship of the four conveyor sections 580, 550b, 550a, 510.

Also illustrated in the figures is that each section 510, 550a,b and 580 includes a cable trough 710 parallel to the respective opposed side members, said trough lying beneath the rollers. While the trough is suitable for carrying data and power cables for operation of conveyor 124a, they may further carry power and control signal cabling for the associated components such as the conveyor interface component 140, modular driving apparatus 160, and operator platform 410.

To facilitate the telescoping operation, particularly between sections, additional guide rollers 602 may be mounted to an outside of and adjacent section's opposed side member.

In one embodiment, the power ramp (540, 570a,b) for the bi-directional conveyor includes a motorized ramp roller 750, an idler component 756 (radiused surface, plurality of adjacent wheels on an axle), located at a level offset (below) a plane defined by the plurality of cylindrical conveyor rollers (e.g., 512); and a continuous belt 760 placed around the motorized ramp roller 750 and the idler component 756 so that an interior surface of the belt is in contact with an outer surface of the motorized ramp roller to cause movement of the belt in response to movement of the motorized ramp roller, and thereby assist in the transfer of an object (e.g., package) between conveyor sections. As will be appreciated for some motorized ramp rollers, it may be advantageous to include a support member 770, located between the motorized ramp roller 750 and the idler component 756, where the support member includes a low-friction surface to contact the interior surface of the belt 760.

Figures 55, 56, 57:
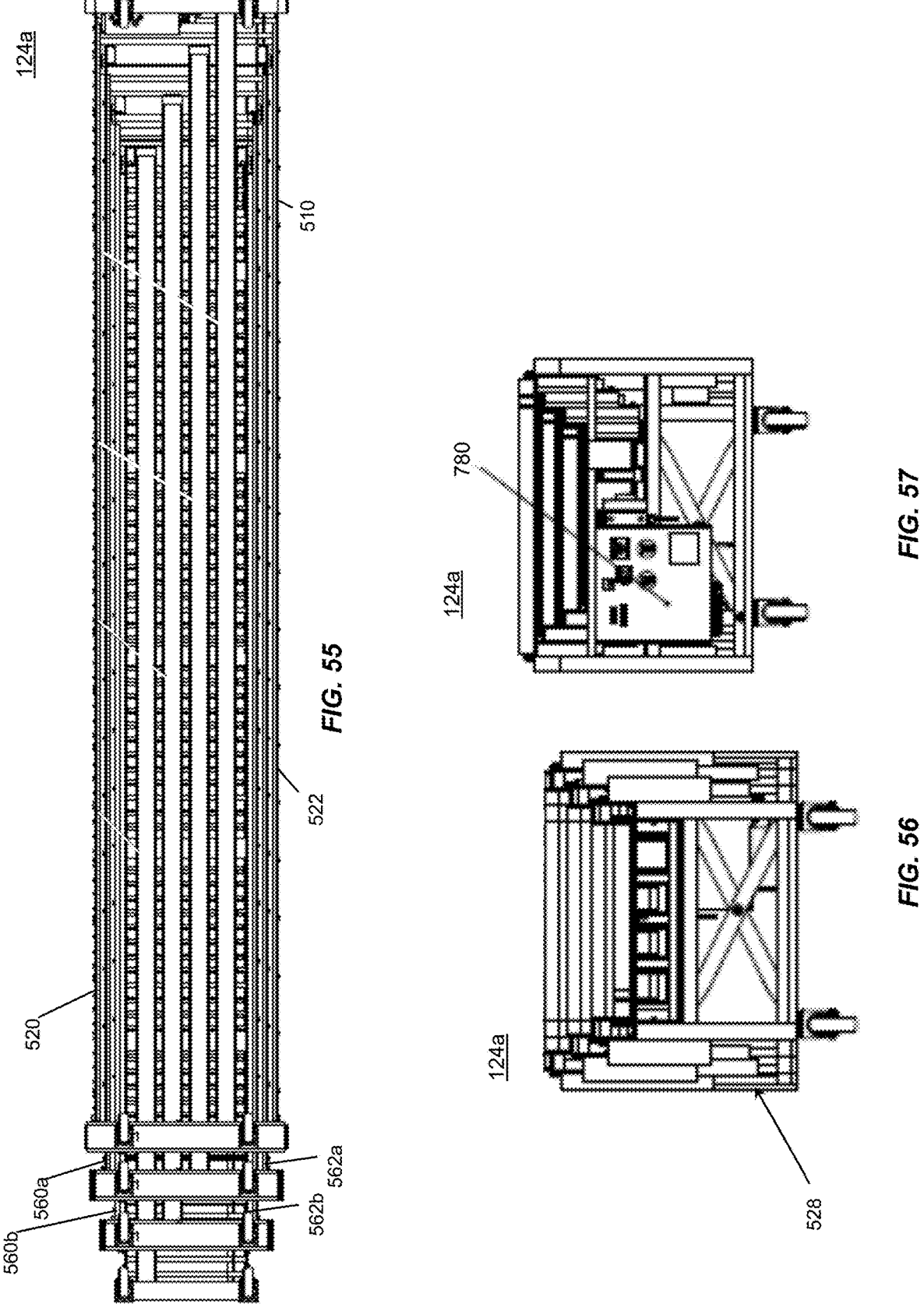

As depicted, for example in FIG. 57, the bi-directional conveyor 124a includes a control panel 780, the control panel including electronics and a programmable controller for controlling, in response input signals (e.g., from sensors, operator interface, etc.) the operation of the conveyor including the speed and direction of the motorized rollers and height of each pair of auto-leveling legs. The operation of the conveyor provides zones for accumulation, indexing, gap control, and speed control to facilitate efficient transfer of product to/from the conveyor. The conveyor 124a has distributed power and control modules on each telescoping section for integration of actuator and sensing devices. A micro controller (not shown, in control panel 780) is used for real time evaluation and operation control based on the telescoping section positions, adjustable leg elevations, top-side surface package sensors, proportional control feedback and barcode scanning. A master/slave strategy is used to co-ordinate the dynamic responses to floor elevation changes during extension and retraction of telescopic sections as described in more detail above.

The overall length of the telescoping conveyor 124a is broken into independently controlled zones. Each zone has an adjustable speed control providing the ability to index packages, allowing for accumulation of packages, and creating controlled gaps between packages for presentation to operators or automation. The control system for conveyor 124a, as well as associated conveyor interface component 140, is capable of package data collection, package counting, package weight feedback to operating personnel prior to handling, package divert and buffer decision making, and re-feeding of identified packages into a loading stream. The control system integrates with other equipment on either end with exchange signals for seamless package transfer.

The smart conveyor has distributed power and control modules on all telescopic sections for integration of actuator and sensing devices. A micro controller in control panel 780 is used for real time evaluation and control based on telescopic extension positions, leg elevations, package sensors, proportional control feedback, barcode scanning. A master/slave strategy is used to co-ordinate the dynamic responses to floor elevation changes during extension and retraction of telescopic sections.

The overall length of the conveyor is broken into independently controlled zones. Each zone has adjustable speed control providing the ability to index packages, provide accumulation of packages, create controlled gaps between packages for presentation to operators or automation. The control system is capable of package data collection, package counting, package weight feedback to operating personnel prior to handling, package divert and buffer decision making, re-feed identified packages into the loading stream. The control system integrates with other equipment on either end with exchange signals for seamless package transfer.

Figure 72:
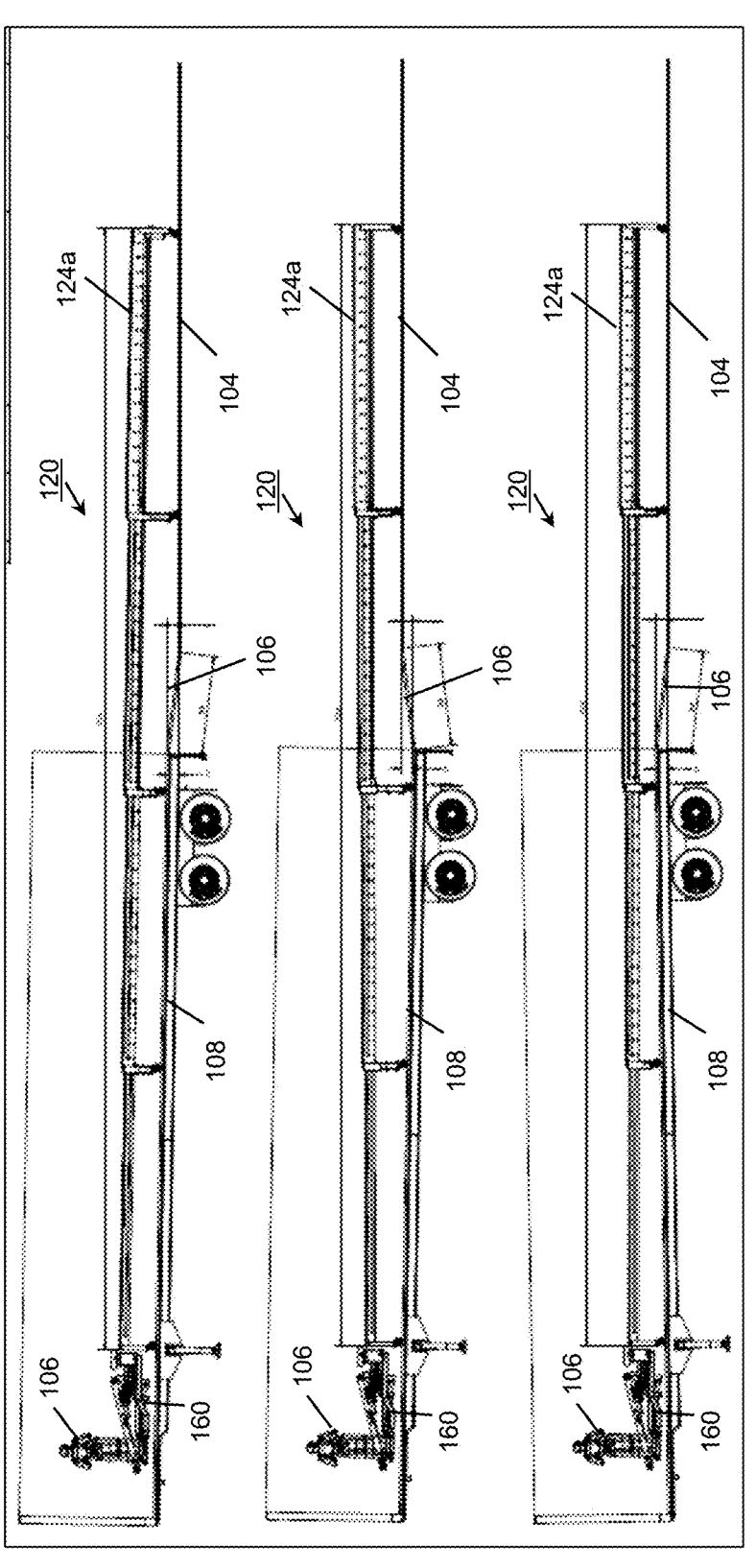
FIG. 72 is a side view of three alternatives for a telescoping conveyor system deployed within a trailer showing differing height and slope configurations.

FIG. 72 presents a side view of three alternatives for a conveyor system 120 employing a telescoping conveyor 124a described above, where the conveyor is deployed within trailers of differing height and slope configurations. The respective figures illustrate the advantage of a conveyor having adjustable (telescoping) legs and associated sensors to allow for adaptation to the various configurations that may be experienced in a shipping facility. For example, the topmost example in FIG. 72 is for a trailer having a bed above the dock floor and which is generally inclined away from the dock. The middle example is for a trailer having a bed lower than the dock floor and inclined away from the dock. The bottom example in FIG. 72 is for a trailer having a bed starting above the dock floor level and declining away from the dock. As shown by a comparison of the leg heights for extendible conveyor 124a, the conveyor is able to adapt to the various configurations.

FIGS. 47-58 are alternative views of the conveyor interface component of FIGS. 2-3, and include illustration of the various features and functions described relative to the driving apparatus 160 and the conveyor interface component 140.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A driving apparatus, comprising:
a frame including a front end and a back end;
first and second independent drive wheels pivotally connected to the frame and operatively connected to be driven by at least one drive motor attached to the frame adjacent the back end, wherein a portion of each drive wheel extends below the bottom of the frame;
at least one caster wheel attached to the frame adjacent the front end at a position spaced apart from the first and second independent drive wheels, said caster wheel having a portion extending below the bottom of the frame;
a power source providing power to operate the at least one drive motor in response to control signals; and
an attachment pedestal, extending upward from the frame, to attach at least one conveyor interface component, wherein said first and second independent drive wheels are connected to the frame along a common axis, and are independently connected to respective first and second independent drive motors.

2. The driving apparatus according to claim 1, further comprising a housing generally enclosing the frame, said housing including a top, a bottom and a plurality of sides.

3. The driving apparatus according to claim 2, wherein the frame further includes at least one connection mechanism extending from the front end or the back end, and through the housing for attachment to and driving of another mechanical apparatus.

4. The driving apparatus according to claim 1, further comprising first and second gearboxes, operatively connecting the respective first and second independent drive motors to the respective first and second independent drive wheels.

5. The driving apparatus according to claim 3, wherein said drive wheels are positioned to provide 180-degree turning.

6. The driving apparatus according to claim 1, further comprising a conveyor interface component connected to the attachment pedestal, the conveyor interface component is operatively attached to the driving apparatus to facilitate driving and steering of a conveyor end as well as providing a conveying interface for exchanging objects with the end of the conveyor.

7. The driving apparatus according to claim 6, wherein said conveying interface includes a multi-belt conveyor assembly, said a multi-belt conveyor assembly having multiple parallel belts, each driven in unison with one another.

8. The driving apparatus according to claim 7, wherein said multi-belt conveyor assembly is pivotable about a horizontal axis, and is swingable to cover an operable horizontal and vertical range.

9. The driving apparatus according to claim 1, further comprising adjustable leveling casters mounted to the back of the frame.

10. The driving apparatus according to claim 1, further comprising a controller suitable for receiving an input and controlling the movement of the driving apparatus in response to the input.

11. The driving apparatus according to claim 10, including at least one sensor for sensing objects including adjacent walls, said controller receiving an input from the at least one sensor and automatically adjusting operation of the driving apparatus in response.

12. The driving apparatus according to claim 1, including an array of ultrasonic sensors for sensing objects, said controller automatically adjusting operation of the driving apparatus in response to signals from said array of ultrasonic sensors.

13. The driving apparatus according to claim 10, where the driving apparatus moves in response to an operator input.

14. The driving apparatus according to claim 13, wherein operator input is provided by an operating handle having four quadrant operation.

15. The driving apparatus according to claim 14, wherein the operating handle further operates in one of at least two selectable control modes, including a first mode for controlling travel of the driving apparatus, and a second mode for controlling the tilt position of the at least one conveyor interface component.

16. The driving apparatus according to claim 11, wherein said frame is a counterweight frame for traction capacity.

17. A driving apparatus, comprising:

a frame including a front end and a back end;

first and second independent drive wheels pivotally connected to the frame and operatively driven by at least one drive motor attached to the frame adjacent the back end, wherein a portion of each drive wheel extends below the bottom of the frame, and where the independent drive wheels are independently driven with respect to one another to provide turning for the driving apparatus about a vertical axis;

at least one caster wheel attached to the frame adjacent the front end at a position spaced apart from the first and second independent drive wheels, said caster wheel having a portion extending below the bottom of the frame;

a power source providing power to operate the at least one drive motor in response to control signals; and an attachment pedestal, extending upward from the frame, to attach at least one conveyor interface component, wherein the driving apparatus turns through a 180-degree range around a vertical driving axis located midway between the first and second independent drive wheels.

18. The driving apparatus according to claim 11, wherein the attachment pedestal further includes a pivotally attached mid-support.

19. The driving apparatus according to claim 1, wherein the attachment pedestal further includes a mid-support slidably connected to the attachment pedestal.

20. The driving apparatus according to claim 11, further including a mid-support slidably and pivotally connected to the attachment pedestal.

21. The driving apparatus according to claim 20, further including at least one adjustable conveying section attached to and supported by the mid-support.

22. The driving apparatus according to claim 1, further including:

a mid-support slidably and pivotally connected to the attachment pedestal;

an extendible conveyor, detachably connected to the modular driving apparatus, for loading and unloading objects from the extendible conveyor;

an adjustable conveying apparatus including at least one pivoting conveyor operatively affixed on the mid-support, said adjustable conveying apparatus suitable to exchange objects with the extendible conveyor on a first end and with an operator on an opposite second end; and a movable operator platform removably connected to the driving apparatus and positioned adjacent the second end of the adjustable conveying apparatus.

23. A driving apparatus, comprising:

a frame including a front end and a back end;

first and second independent drive wheels pivotally connected to the frame and operatively driven by at least one drive motor attached to the frame adjacent the back end, wherein a portion of each drive wheel extends below the bottom of the frame, and where the independent drive wheels are independently driven with respect to one another to provide turning for the driving apparatus about a vertical axis;

at least one caster wheel attached to the frame adjacent the front end at a position spaced apart from the first and second independent drive wheels, said caster wheel having a portion extending below the bottom of the frame;

a power source providing power to operate the at least one drive motor in response to control signals;

an attachment pedestal, extending upward from the frame, to attach at least one conveyor interface component;

a mid-support slidably and pivotally connected to the attachment pedestal;

an extendible conveyor, detachably connected to the driving apparatus, for loading and unloading objects from the extendible conveyor;

an adjustable conveying apparatus including at least one pivoting conveyor operatively affixed on the mid-support, said adjustable conveying apparatus suitable to exchange objects with the extendible conveyor on a first end and with an operator on an opposite second end; and a movable operator platform removably connected to the driving apparatus and positioned adjacent the second end of the adjustable conveying apparatus, where said extendible conveyor includes a bi-directional conveyor, comprising:

a plurality of telescoping conveyor sections, including an outermost conveyor section of a first width, the outermost conveyor section includes, a pair of opposed side members, at least one pair of auto-leveling legs attached to and supporting the opposed side members of the outermost conveyor section adjacent an end thereof, at least one pair of guide rollers and a pair of opposed guide channels are mounted on an interior of each opposed side member of the outermost conveyor section, a conveying surface spanning between the opposed side members of the outermost conveyor section, and a power ramp at a first end of the outermost conveyor section to facilitate transfer of an object between the outermost conveyor section and the adjacent nested conveyor section; and an extendible conveyor section nested within the outermost conveyor section, the extendible conveyor section includes, a pair of opposed side members, at least one pair of auto-leveling legs attached to and supporting the opposed side members of the extendible conveyor section, a guide rail mounted on an exterior of each opposed side member of the extendible conveyor section, where said guide rail passes through the rollers and guide rails of the outermost conveyor section to facilitate telescoping of the extendible section relative to the outermost conveyor section, a conveying surface spanning between the opposed side members of the extendible conveyor section.

24. An apparatus for driving an extendible conveyor, comprising:

a frame including a front end and a back end;

at least one drive wheel pivotally connected to the frame and operatively connected to be driven by at least one drive motor, wherein a portion of the drive wheel extends below the bottom of the frame, said at least one drive wheel changing the drive direction of the apparatus around a vertical axis;

at least one caster wheel attached to the frame at a position spaced apart from the drive wheel, said caster wheel having a portion extending below the bottom of the frame;

a power source providing power to operate the at least one drive motor in response to control signals; and an attachment pedestal, extending upward from the frame, to which at least one conveyor interface component is operatively attached to interface to the extendible conveyor.

25. The apparatus according to claim 24, where said extendible conveyor includes a bi-directional conveyor, comprising:

a plurality of telescoping conveyor sections, each conveyor section including a conveying surface;

at least one pair of auto-leveling legs attached to and supporting one of said plurality of telescoping conveyor sections; and at least one power ramp at a transition between conveyor sections to facilitate transfer of an object.

26. The apparatus according to claim 24, wherein a first end of the conveyor interface component is operatively attached to the extendible conveyor to facilitate driving and steering of the extendible conveyor as well as providing a conveying interface for exchanging objects with an end of the extendible conveyor.

27. The apparatus according to claim 26, further including a movable operator platform removably connected to the apparatus and positioned adjacent a second end of the conveyor interface component.

28. An extendible conveyor, comprising:

a plurality of telescoping conveyor sections, including an outermost conveyor section of a first width, the outermost conveyor section includes, a first pair of opposed side members, at least a first pair of auto-leveling legs attached to and supporting the opposed side members of the outermost conveyor section adjacent an end thereof, at least a first pair of guide rollers and a first pair of opposed guide channels mounted on an interior of each first opposed side member of the outermost conveyor section, a first conveying surface between the first pair of opposed side members of the outermost conveyor section, wherein at least a portion of the first conveying surface may be driven, and a first power ramp at a first end of the outermost conveyor section to facilitate transfer of an object between the outermost conveyor section and an adjacent nested conveyor section;

the nested conveyor section nestable within the outermost conveyor section, is also extendible from within the outermost conveyor section and includes, a second pair of opposed side members, at least one second pair of auto-leveling legs attached to and supporting the second pair of opposed side members of the nested conveyor section, a second guide rail mounted on an exterior of each of the second pair of opposed side member of the nested conveyor section, where said second guide rail passes through the first rollers and first guide rails of the outermost conveyor section to facilitate telescoping of the nested conveyor section relative to the outermost conveyor section, a second conveying surface between the second pair of opposed side members of the nested conveyor section, wherein at least a portion of the second conveying surface may be driven.

29. The conveyor according to claim 28, wherein said conveying surfaces are selected from the group consisting of: a plurality of cylindrical conveyor rollers; a flexible belt; a combination of flexible belt and conveyor rollers, at least one of which is driven.

30. The conveyor according to claim 28, wherein each of said at least one pair of auto-leveling legs comprises:

a pair of telescoping legs including a plurality of telescoping sections, each telescoping leg extending downward from a respective one of said side members; and a height-adjusting mechanism to control the length of the telescoping legs; and a pair of caster wheels attached beneath the telescoping legs.

31. The conveyor according to claim 30, wherein the at least one pair of auto-leveling legs further includes:

an upper cross support spanning between the respective opposed side members;

a lower cross support spanning between a lowermost leg section of the respective telescoping legs; and an elevating linkage assembly positioned between the upper cross support and the lower cross support, said elevating linkage assembly including a first pair of parallel members pivotally attached mid-length to a second pair of parallel members, wherein one end of the first pair of members is pivotally attached to the upper cross support and one end of the second pair of members is pivotally attached to the lower cross support, and where an opposite end of the first pair of members is operatively attached to a linear actuator such that activation of the linear actuator results in a change in height of the elevating linkage assembly, thereby extending and retracting the telescoping legs.

32. The conveyor according to claim 28, further including at least one sensor associated with each pair of auto-leveling legs to sense when the legs are no longer in contact with a surface below and when the top of the conveyor section to which the legs are attached exceeds a predefined extension length for the legs.

33. The conveyor according to claim 32, wherein adjustment of the height of each pair of auto-leveling legs is accomplished as a function of the input from the at least one sensor associated with each pair of auto-leveling legs.

34. The conveyor according to claim 32, wherein adjustment of the height of each pair of auto-leveling legs is accomplished as a function of the input from a plurality of sensors each associated with multiple pairs of auto-leveling legs.

35. The conveyor according to claim 28, further including at least one sensor associated with each pair of auto-leveling legs to sense an angle of inclination of the telescoping conveyor section to which the pair of auto-leveling legs is attached.

36. The conveyor according to claim 28, wherein each conveyor section includes a cable trough parallel to the opposed side members, said trough lying beneath the rollers.

37. The conveyor according to claim 28, further including a guide roller mounted to an outside of the opposed side members of the extendible conveyor section.

38. The conveyor according to claim 28, wherein the conveying surface of each telescoping conveyor section includes a plurality of rollers and at least one motorized roller, wherein each motorized roller is capable of driving one or more non-motorized rollers.

39. The conveyor according to claim 38, wherein each conveyor roller includes a pair of annular grooves to facilitate the retention and tracking of a continuous member operatively connecting adjacent rollers.

40. The conveyor according to claim 28, wherein the power ramp includes:

a motorized ramp roller;

an idler component, located at a level offset from a plane of the conveying surface; and a continuous belt placed around the motorized ramp roller and the idler component wherein an interior surface of the belt is in contact with an outer surface of the motorized ramp roller to cause movement of the belt in response to movement of the motorized ramp roller and thereby transfer of an object between conveyor sections.

41. The conveyor according to claim 40, further including a support member, located between the motorized ramp roller and the idler component, where the support member includes a low-friction surface to contact the interior surface of the belt.

42. The conveyor according to claim 38, further including a control panel, the control panel including electronics and a programmable controller for controlling, in response to input signals, the operation of the conveyor including the speed and direction of the conveying surface and height of each pair of auto-leveling legs.

43. The conveyor according to claim 42, wherein the operation of the conveyor provides zones for accumulation, indexing, gap control, and speed control to facilitate efficient transfer of product to or from the conveyor.

44. The conveyor according to claim 28, further including a detachably connected driving apparatus comprising:

a frame including a front end and a back end;

first and second independent drive wheels pivotally connected to the frame, each drive wheel operatively connected to a respective one of first and second independent drive motors attached to the frame adjacent the back end, wherein a portion of each drive wheel extends below the bottom of the frame;

at least one caster wheel attached to the frame adjacent the front end and at a position spaced apart from the common axis, said caster wheel having a portion extending below the bottom of the frame;

a power source providing power to operate each of the first and second independent drive motors in response to control signals; and an attachment pedestal, extending upward from the frame, to which one or more conveyor interface components may be operatively attached to interface with one of the plurality of telescoping conveyor sections.

45. An extendible conveyor, comprising:

a plurality of telescoping conveyor sections, including an outermost conveyor section of a first width, the outermost conveyor section includes, an outermost pair of opposed side members, at least a first pair of auto-leveling legs attached to and supporting the opposed side members of the outermost conveyor section adjacent an end thereof, at least a first pair of guide rollers and a first pair of opposed guide channels are mounted on an interior of each opposed side member of the outermost conveyor section, a first conveying surface spanning between the opposed side members of the outermost conveyor section, and a first power ramp at a first end of the outermost conveyor section to facilitate transfer of an object between the outermost conveyor section and an adjacent nested conveyor section;

at least one of N extendible conveyor section nested within the outermost conveyor section, each of the Nth extendible conveyor sections having a progressively smaller width and including, an Nth pair of opposed side members, at least an Nth pair of auto-leveling legs attached to and supporting the opposed side members of the Nth nested conveyor section, at least an Nth pair of guide rollers and an Nth pair of opposed guide channels mounted on an interior of each opposed side member of the Nth extendible conveyor section and a guide rail mounted on an exterior of each opposed side member of the Nth extendible conveyor section, where said guide rail passes through the rollers and guide rails of an adjacent conveyor section to facilitate telescoping of the Nth extendible section relative to the adjacent conveyor section, an Nth conveying surface spanning between the opposed side members of the Nth extendible conveyor section, and an Nth power ramp at a first end of the Nth extendible conveyor section to facilitate transfer of the object between adjacent conveyor sections; and an innermost conveyor section nested within one of the Nth extendible conveyor sections, the innermost conveyor section includes, a last, innermost pair of opposed side members, at least a last pair of auto-leveling legs attached to and supporting the opposed side members of the innermost conveyor section, last guide rails are mounted on an exterior of each of the innermost opposed side members of the innermost conveyor section, where said last guide rail pass through the rollers and guide rails of an adjacent one of the Nth extendible conveyor sections to facilitate a telescoping of the innermost section relative to the adjacent one of the Nth conveyor section, and a conveying surface spanning between the opposed side members of the innermost conveyor section.

46. A movable conveying system for loading and unloading objects from an extendible conveyor comprising:

a driving apparatus removably connectable to the extendible conveyor;

an adjustable conveying apparatus including at least one pivoting conveyor operatively affixed on the driving apparatus, said adjustable conveying apparatus suitable to exchange objects with the extendible conveyor on a first end and with an operator on an opposite second end; and a movable operator platform removably connected to the driving apparatus and positioned beneath the second end of the pivoting conveyor.

47. The movable conveying system according to claim 46, wherein said movable operator platform comprises:

a telescoping base including a first frame member and a second frame member, wherein the second frame member slides horizontally within the first frame member such that a footprint of the periphery of the base is expanded or contracted by sliding the second base frame member relative the first base frame member;

a telescoping operator surface including an outer frame member and an inner frame member, wherein the inner frame member slides horizontally within the outer frame member such that a footprint of the operator support surface is expanded or contracted by sliding the inner frame member relative the outer frame member; and a platform elevation system operatively connecting the telescoping base to the operator support surface to enable the height of the operator support surface to be controlled relative to the telescoping base.

48. The movable conveying system according to claim 47, wherein the platform elevation system comprises:

at least two elevator mechanisms, wherein a first elevator mechanism is operatively connected between a first frame member of the base and the outer frame member of the operator support and a second elevator mechanism is operatively connected between a second frame member of the base and the inner frame member of the operator support; and a first actuator operatively connected to the first elevator mechanism for controlling the first elevator mechanism and a second actuator operatively connected to the second elevator mechanism for controlling the second elevator mechanism, wherein the first and second actuators are synchronized to synchronously raise and lower the inner and outer frame members of the telescoping operator support relative to the first and second base frame members of the telescoping base.

49. The movable conveying system according to claim 48, wherein each of the elevator mechanisms include:

at least one assembly positioned between the telescoping base and the telescoping operator support, said assembly including a first pair of parallel members pivotally attached mid-length to a second pair of parallel members, wherein one end of the first pair of members is pivotally attached to the upper cross support and one end of the second pair of members is pivotally attached to the lower cross support, and where an opposite end of the first pair of members is operatively attached to a linear actuator such that activation of the linear actuator results in a change in height of the assembly, thereby raising and lowering the telescoping assembly and the operator support surface.

50. The movable conveying system according to claim 47, wherein the first frame member of the telescoping base includes rigid members extending therefrom for removable connection to at least one connection mechanism of a driving apparatus.

51. The movable conveying system according to claim 47, further including a first operator handrail attached to and extending upward from the outer support platform and a second operator handrail attached to and extending upward from the inner support platform.

52. The movable conveying system according to claim 47, wherein said platform elevation system includes a plurality of actuators, each driving an associated chainfall operatively connected between the telescoping base and the operator support surface.

53. The movable conveying system according to claim 46, wherein the adjustable conveying apparatus comprises:

a support frame operatively attached on the driving apparatus;

a tiltable transition conveyor section having a first end pivotally coupled to the frame for pivotal movement about a first generally horizontal axis and an opposing second end for exchanging objects with the extendible conveyor;

a pivot frame member pivotally coupled to the support frame for pivotal movement about a generally vertical axis; and a slewing conveyor section having a first end pivotally coupled to the pivot frame member for pivotal movement about a second generally horizontal axis and an opposing second end shaped for exchanging objects, wherein the first generally horizontal axis and the second generally horizontal axis are maintained by the support frame and the pivot frame, respectively, at the same vertical height.

54. The movable conveying system according to claim 53, wherein the driving apparatus includes a pair of drive wheels and turns through a 180-degree range around a vertical driving axis located midway between the pair of drive wheels, and where the transition assembly is also centered about the vertical driving axis.

55. The movable conveying system according to claim 46, wherein said driving apparatus includes:

a frame including a front end and a back end;

at least one drive wheel connected to the frame, the at least one drive wheel operatively connected to a drive motor attached to the frame, wherein a portion of the at least one drive wheel extends below the bottom of the frame adjacent a back end;

at least one caster wheel attached to the frame adjacent the front end and at a position spaced apart from the at least one drive wheel, said caster wheel having a portion extending below the bottom of the frame;

a power source providing power to operate the drive motor in response to control signals; and an attachment pedestal, extending upward from the frame, to which one or more conveyor interface components may be operatively attached.

56. A movable operator platform suitable for attachment to a conveyor driving apparatus, the movable operator platform comprising:

a telescoping base including a first frame member and a second frame member, wherein the second frame member slides horizontally within the first frame member such that a footprint of the base is expanded or contracted by sliding the second base frame member relative the first base frame member;

a telescoping operator platform including an outer frame member and an inner frame member, wherein the inner frame member slides horizontally within the outer frame member such that a footprint of the operator platform is expanded or contracted by sliding the inner frame member relative the outer frame member; and a platform elevation system operatively connecting the telescoping base to the operator platform to enable the height of the operator platform to be controlled relative to the telescoping base.

57. The movable operator platform according to claim 56, wherein the platform elevation system comprises:

at least two elevator mechanisms, wherein a first elevator mechanism is operatively connected between the first generally C-shaped frame member of the base and the outer frame member of the operator platform and a second elevator mechanism is operatively connected between the second generally T-shaped frame member of the base and the inner frame member of the operator platform; and a first electromechanical actuator for controlling the first elevator mechanism and a second electromechanical actuator for controlling the second elevator mechanism, wherein the first and second electromechanical actuators are electronically synchronized to raise and lower the inner and outer frame members of the telescoping operator platform relative to the first and second base frame members of the telescoping base.

58. The movable operator platform according to claim 56, wherein the platform elevation system comprises:

a plurality of actuators operatively connected to a sprocket, the sprocket engaged with a chain having a first end operatively connected to a base and a second end operatively connected to a movable operator surface, and where upon extension or retraction of the plurality of actuators the movable operator surface raises or lowers.

59. The movable operator platform according to claim 57, wherein each of the elevator mechanisms include:

at least one assembly positioned between the telescoping base and the telescoping operator platform, said assembly including a first pair of parallel members pivotally attached mid-length to a second pair of parallel members, wherein one end of the first pair of members is pivotally attached to the upper cross support and one end of the second pair of members is pivotally attached to the lower cross support, and where an opposite end of the first pair of members is operatively attached to an actuator such that activation of the actuator results in a change in height of the assembly, thereby raising and lowering the telescoping legs.

60. The movable operator platform according to claim 56, wherein the first frame member of the telescoping base includes rigid members extending therefrom for removable connection to at least one connection mechanism of a driving apparatus.

61. The movable operator platform according to claim 56, further including a first operator handrail attached to and extending upward from the outer platform and a second operator handrail attached to and extending upward from the inner platform.

* * * * *